US012782849B2

(12) United States Patent
Sakamaki

(10) Patent No.: US 12,782,849 B2
(45) Date of Patent: Nov. 3, 2026

(54) DEVELOPING DEVICE INCLUDING SUPPLYING ROLLER WITH MAGNETIC FLUX DENSITY FOR CONTROLLING DEVELOPER MOVEMENT

(71) Applicant: CANON KABUSHIKI KAISHA, Tokyo (JP)

(72) Inventor: Tomoyuki Sakamaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/606,016

(22) Filed: Mar. 15, 2024

(65) Prior Publication Data

US 2024/0353776 A1 Oct. 24, 2024

(30) Foreign Application Priority Data

Apr. 14, 2023 (JP) ................................ 2023-066247

(51) Int. Cl.
*G03G 15/08* (2006.01)
*G03G 15/09* (2006.01)

(52) U.S. Cl.
CPC ..... *G03G 15/0921* (2013.01); *G03G 15/0808* (2013.01); *G03G 15/0877* (2013.01); *G03G 15/0891* (2013.01); *G03G 2215/0609* (2013.01); *G03G 2215/0869* (2013.01)

(58) Field of Classification Search
CPC ........... G03G 15/0921; G03G 15/0877; G03G 15/0891; G03G 15/0808; G03G 15/0812; G03G 15/0893; G03G 2215/0609; G03G 15/0815; G03G 2215/0869
See application file for complete search history.

(56) References Cited

U.S. PATENT DOCUMENTS

| | | | |
|---|---|---|---|
| 9,864,298 | B2 | 1/2018 | Shimizu et al. |
| 11,262,672 | B2 | 3/2022 | Sakamaki et al. |
| 11,782,362 | B2 | 10/2023 | Sakamaki et al. |
| 11,982,954 | B2 | 5/2024 | Suzuki et al. |

(Continued)

FOREIGN PATENT DOCUMENTS

| | | |
|---|---|---|
| JP | 2009-198582 A | 9/2009 |
| JP | 2014-153608 A | 8/2014 |

(Continued)

*Primary Examiner* — Stephanie E Bloss
*Assistant Examiner* — Laura Roth
(74) *Attorney, Agent, or Firm* — VENABLE LLP

(57) ABSTRACT

A developing device includes a developing roller to convey toner and a supplying roller to supply the toner. A region where an absolute value of a magnetic flux density in a normal direction of the supplying roller is 5 [mT] or less exists downstream of a position where a magnetic flux density of a third magnetic pole of the supplying roller is maximum, and exists upstream of a position where a magnetic flux density of a fourth magnetic pole of the supplying roller is maximum. A most upstream position of the region exists above a rotation center of the supplying roller, and an absolute value of a magnetic flux density in a tangential direction of the supplying roller in the most upstream position of the region is larger than an absolute value of a magnetic flux density of the supplying roller in the most upstream position of the region.

14 Claims, 10 Drawing Sheets

(56) References Cited

U.S. PATENT DOCUMENTS

| | | | | |
|---|---|---|---|---|
| 2003/0021614 | A1 * | 1/2003 | Takeuchi ........... | G03G 15/0921 399/277 |
| 2006/0182467 | A1 * | 8/2006 | Aoki .................. | G03G 15/0877 399/254 |
| 2007/0059047 | A1 * | 3/2007 | Kamiya ............. | G03G 15/0928 399/277 |
| 2008/0124137 | A1 * | 5/2008 | Nakaue ............. | G03G 15/0921 399/277 |
| 2015/0268586 | A1 * | 9/2015 | Sakamaki .......... | G03G 15/0921 399/269 |
| 2017/0269510 | A1 * | 9/2017 | Tamaki .............. | G03G 15/0889 |
| 2017/0299977 | A1 * | 10/2017 | Shimizu ............. | G03G 15/0928 |
| 2023/0400797 | A1 | 12/2023 | Sakamaki et al. | |

FOREIGN PATENT DOCUMENTS

| | | | |
|---|---|---|---|
| JP | 2017-021278 | A | 1/2017 |
| JP | 2017-191220 | A | 10/2017 |
| JP | 2019-049746 | A | 3/2019 |

* cited by examiner (COMPARISON EXAMPLE 1)

(a)

(b)

(COMPARISON EXAMPLE 2)

(a)

(b)

DEVELOPING DEVICE INCLUDING SUPPLYING ROLLER WITH MAGNETIC FLUX DENSITY FOR CONTROLLING DEVELOPER MOVEMENT

FIELD OF THE INVENTION AND RELATED ART

The present invention relates to a developing device including a developing roller and a supplying roller.

In the developing device, conventionally, one using a two-component developer containing toner comprising non-magnetic particles and a carrier comprising magnetic particles (hereinafter, the two-component developer is simply referred to as the developer) has been known. As such a developing device, a constitution using a so-called hybrid developing type including a developing roller as a rotatable developing member provided opposed to a photosensitive drum as an image bearing member and including a supplying roller as a rotatable supplying member provided opposed to the developing roller has been proposed (Japanese Laid-Open Patent Applications (JP-A) 2009-198582 and 2017-21278).

In such a developing device using the hybrid developing type, the developer is carried on the supplying roller in which a magnet is provided, and a toner layer is formed on the developing roller from the developer conveyed by rotation of the supplying roller, and then, an electrostatic latent image on the photosensitive drum is developed with the toner by the developing roller.

In the developing device disclosed in JP-A 2009-198582, the magnet provided inside the supplying roller includes a first magnetic pole provided in a position where the first magnetic pole opposes the developing roller. Further, with respect to a rotational direction of the supplying roller, the magnet includes a second magnetic pole provided on a side downstream of the first magnetic pole and for peeling the developer from the supplying roller, and includes a third magnetic pole provided downstream of and adjacent to the second magnetic pole and for scooping the developer from a developing container to the supplying roller. Further, a low magnetic force section is provided between the second magnetic pole and the third magnetic pole. Further, in the developing device disclosed in JP-A 2017-21278, in a position opposing the low magnetic force section, a wall portion of the developing container is provided opposed to the low magnetic force section.

Here, in the case where the rotational direction of the supplying roller, the second magnetic pole is positioned on a relatively downstream side and a most upstream position of the low magnetic force section is positioned below a rotation center of the supplying roller, the developer peeled off from the supplying roller in the low magnetic force section is liable to receive a force toward the third magnetic pole positioned downstream of the second magnetic pole with respect to the rotational direction of the supplying roller with rotation of the supplying roller. Then, developer movement with rotation of the supplying roller such that the developer short in toner by consumption of the toner is peeled off from the supplying roller and thereafter is attracted to the supplying roller again by a magnetic force of the third magnetic pole is liable to occur. When such a developer movement with rotation of the supplying roller occurs, the toner is supplied to the developing roller from the developer low in a ratio of the toner, so that a quality of an output image lowers.

On the other hand, even in the case where the second magnetic pole is positioned on a relatively upstream side with respect to the rotational direction of the supplying roller and the most upstream position of the low magnetic force section is positioned above the rotation center of the supplying roller, as disclosed in JP-A 2017-21278, when the wall portion exists while opposing the low magnetic force section, the developer movement with rotation of the supplying roller is liable to occur. That is, in the case where the most upstream position of the low magnetic force section is positioned above the rotation center of the supplying roller, the developer peeled off from the supplying roller is liable to receive a force in a direction in which the developer is separated from the supplying roller with rotation of the supplying roller. At this time, there is a liability that the developer peeled off from the supplying roller collides with the wall portion and rebounds from the wall portion, and then flies again in a direction of the supplying roller. As a result, even in such a constitution, the developer movement with rotation of the supplying roller is liable to occur, so that there is a possibility that a lowering in quality of an output image occurs.

SUMMARY OF THE INVENTION

A principal object of the present invention is to suppress developer movement with rotation of a supplying roller.

According to an aspect of the present invention, there is provided a developing device comprising: a developing container configured to accommodate a developer containing toner and a carrier; a developing roller configured to carry and convey the toner to a developing position where an electrostatic latent image formed on an image bearing member is developed with the toner; a supplying roller provided opposed to the developing roller and configured to supply only the toner to the developing roller while carrying and conveying the developer supplied from the developing container; a regulating member provided opposed to the supplying roller and configured to regulate an amount of the developer carried by the supplying roller; a first magnet provided non-rotationally and fixedly inside the developing roller and including a first magnetic pole; and a second magnet provided non-rotationally and fixedly inside the supplying roller and including a second magnetic pole which is provided opposed to the first magnetic pole and which is different in polarity from the first magnetic pole, a third magnetic pole provided downstream of the second magnetic pole with respect to a rotational direction of the supplying roller, and a fourth magnetic pole which is provided downstream of and adjacent to the third magnetic pole with respect to the rotational direction of the supplying roller and which is the same in polarity as the third magnetic pole, wherein with respect to the rotational direction of the supplying roller, a position where a magnetic flux density of the third magnetic pole in a normal direction of the supplying roller is maximum is downstream of a position on the supplying roller where the supplying roller is closest to the developing roller, and is upstream of a position on the supplying roller where the regulating member is closest to the supplying roller, wherein with respect to the rotational direction of the supplying roller, a region where an absolute value of a magnetic flux density in the normal direction of the supplying roller is 5 [mT] or less exists downstream of the position where the magnetic flux density of the third magnetic pole in the normal direction of the supplying roller is maximum, and exists upstream of a position where a magnetic flux density of the fourth magnetic pole in the normal direction of the supplying roller is maximum, wherein a most upstream position of the region with respect to the rotational direction of the supplying roller exists above a rotation center of the supplying roller in a vertical direction, and wherein in the most upstream position of the region, an absolute value of the third magnetic pole in a tangential direction of the supplying roller is larger than an absolute value of the third magnetic pole in the normal direction of the supplying roller.

According to another aspect of the present invention, there is provided a developing device comprising: a developing container configured to accommodate a developer containing toner and a carrier; a developing roller configured to carry and convey the toner to a developing position where an electrostatic latent image formed on an image bearing member is developed with the toner; a supplying roller provided opposed to the developing roller and configured to supply only the toner to the developing roller while carrying and conveying the developer supplied from the developing container; a regulating member provided opposed to the supplying roller and configured to regulate an amount of the developer carried by the supplying roller; a first magnet provided non-rotationally and fixedly inside the developing roller and including a first magnetic pole; and a second magnet provided non-rotationally and fixedly inside the supplying roller and including a second magnetic pole which is provided opposed to the first magnetic pole and which is different in polarity from the first magnetic pole, a third magnetic pole provided downstream of the second magnetic pole with respect to a rotational direction of the supplying roller, and a fourth magnetic pole which is provided downstream of and adjacent to the third magnetic pole with respect to the rotational direction of the supplying roller and which is the same in polarity as the third magnetic pole, wherein with respect to the rotational direction of the supplying roller, a position where a magnetic flux density of the third magnetic pole in a normal direction of the supplying roller is maximum is downstream of a position on the supplying roller where the supplying roller is closest to the developing roller, and is upstream of a position on the supplying roller where the regulating member is closest to the supplying roller, wherein with respect to the rotational direction of the supplying roller, a region where an absolute value of a magnetic flux density in the normal direction of the supplying roller is 5 [mT] or less exists downstream of the position where the magnetic flux density of the third magnetic pole in the normal direction of the supplying roller is maximum, and exists upstream of a position where a magnetic flux density of the fourth magnetic pole in the normal direction of the supplying roller is maximum, wherein a most upstream position of the region with respect to the rotational direction of the supplying roller exists above a rotation center of the supplying roller in a vertical direction, and wherein a direction of the magnetic flux density in the tangential direction of the supplying roller is not reversed in a section from the most upstream position of the region to a position existing downstream of the most upstream position of the region by ½ of the region.

According to a further aspect of the present invention, there is provided a developing device comprising: a developing container configured to accommodate a developer containing toner and a carrier; a developing roller configured to carry and convey the toner to a developing position where an electrostatic latent image formed on an image bearing member is developed with the toner; a supplying roller provided opposed to the developing roller and configured to supply only the toner to the developing roller while carrying and conveying the developer supplied from the developing container; a regulating member provided opposed to the supplying roller and configured to regulate an amount of the developer carried by the supplying roller; a first magnet provided non-rotationally and fixedly inside the developing roller and including a first magnetic pole; and a second magnet provided non-rotationally and fixedly inside the supplying roller and including a second magnetic pole which is provided opposed to the first magnetic pole and which is different in polarity from the first magnetic pole, a third magnetic pole provided downstream of the second magnetic pole with respect to a rotational direction of the supplying roller, and a fourth magnetic pole which is provided downstream of and adjacent to the third magnetic pole with respect to the rotational direction of the supplying roller and which is the same in polarity as the third magnetic pole, wherein with respect to the rotational direction of the supplying roller, a position where a magnetic flux density of the third magnetic pole in a normal direction of the supplying roller is maximum is downstream of a position on the supplying roller where the supplying roller is closest to the developing roller, and is upstream of a position on the supplying roller where the regulating member is closest to the supplying roller, wherein with respect to the rotational direction of the supplying roller, a region where an absolute value of a magnetic flux density in the normal direction of the supplying roller is 5 [mT] or less exists downstream of the position where the magnetic flux density of the third magnetic pole in the normal direction of the supplying roller is maximum, and exists upstream of a position where a magnetic flux density of the fourth magnetic pole in the normal direction of the supplying roller is maximum, wherein a most upstream position of the region with respect to the rotational direction of the supplying roller exists above a rotation center of the supplying roller in a vertical direction, and wherein a product between an absolute value of a maximum value of the magnetic flux density of the third magnetic pole in the normal direction of the supplying roller and a half-value width of the magnetic flux density of the third magnetic pole in the normal direction of the supplying roller is 1.5 times or more, a product between an absolute value of a maximum value of the magnetic flux density of the fourth magnetic pole in the normal direction of the supplying roller and a half-value width of the magnetic flux density of the fourth magnetic pole in the normal direction of the supplying roller.

Further features of the present invention will become apparent from the following description of exemplary embodiments with reference to the attached drawings.

Figure 3:
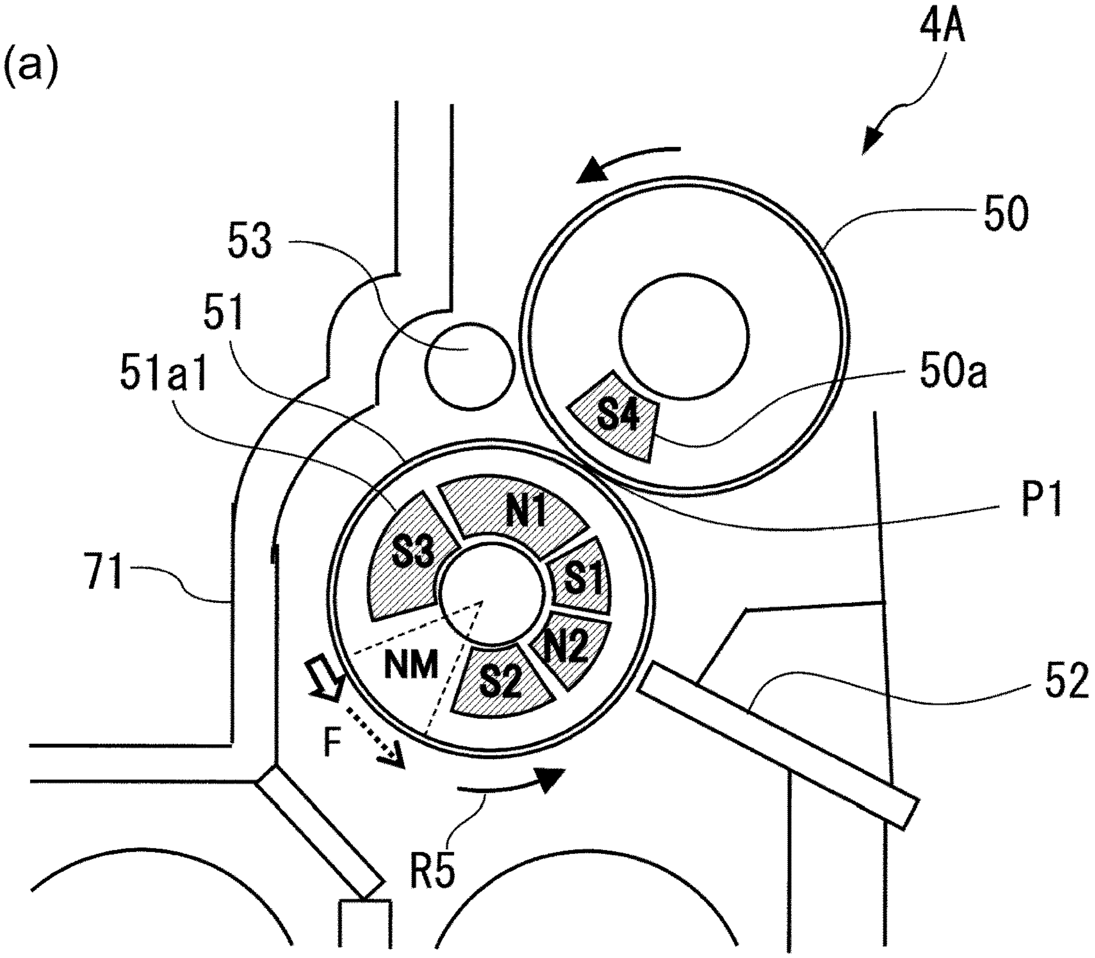
Figure 3:
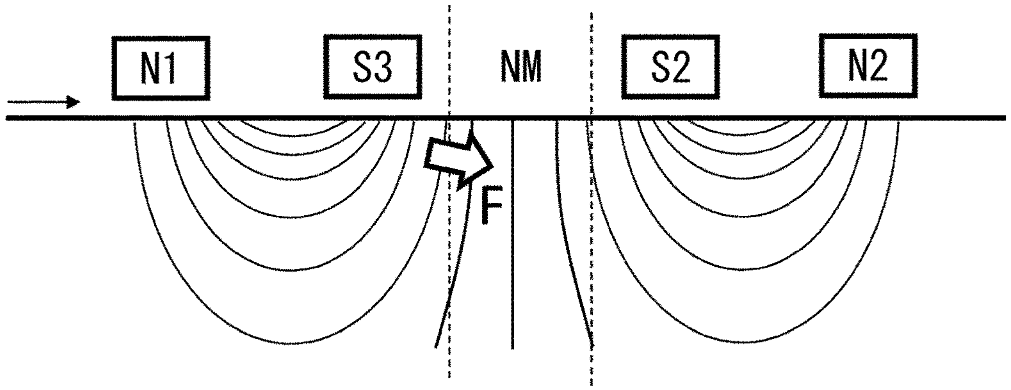

Part (a) of FIG. 3 is a schematic structural sectional view of a developing device according to a comparison example 1 in which a part thereof is enlarged, and part (b) of FIG. 3 is a schematic view showing a state of a magnetic field at a periphery of a low magnetic force section.

Figure 4:
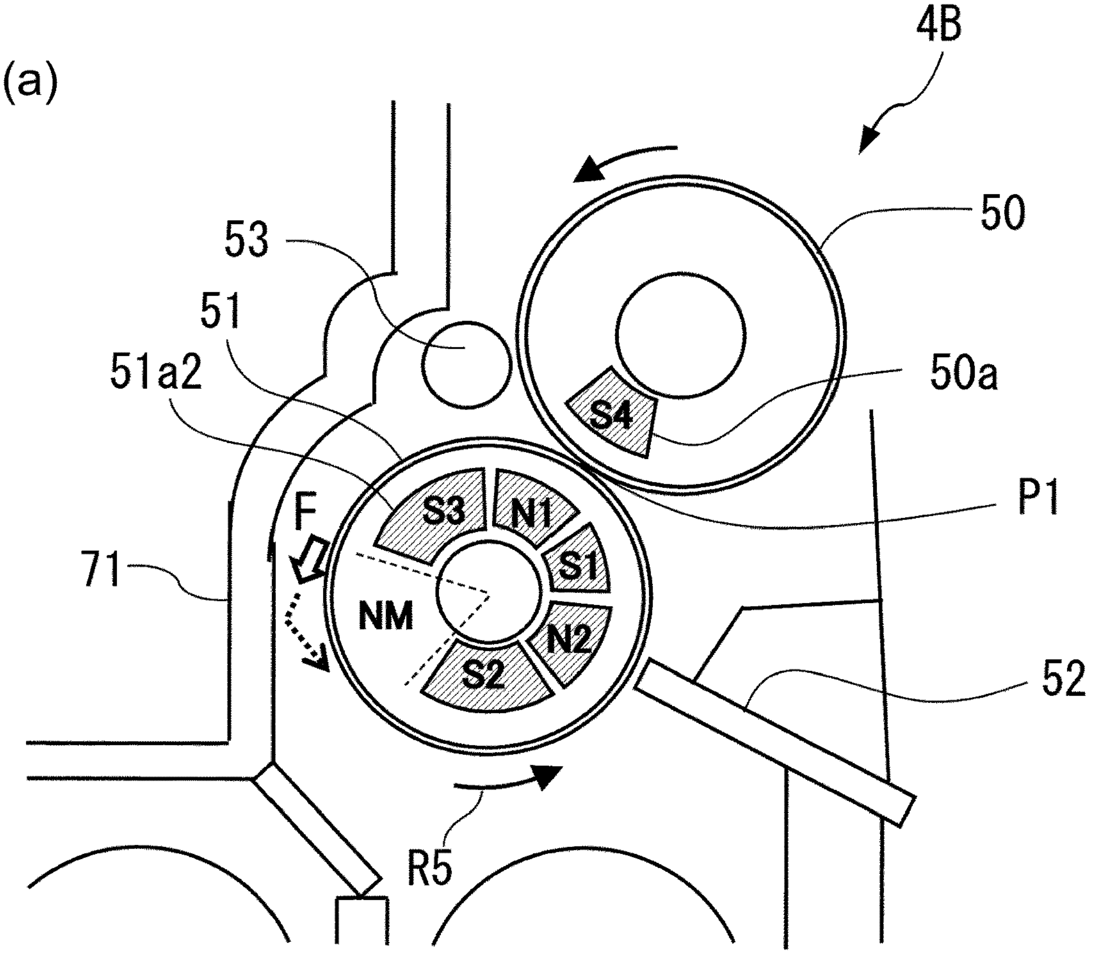
Figure 4:
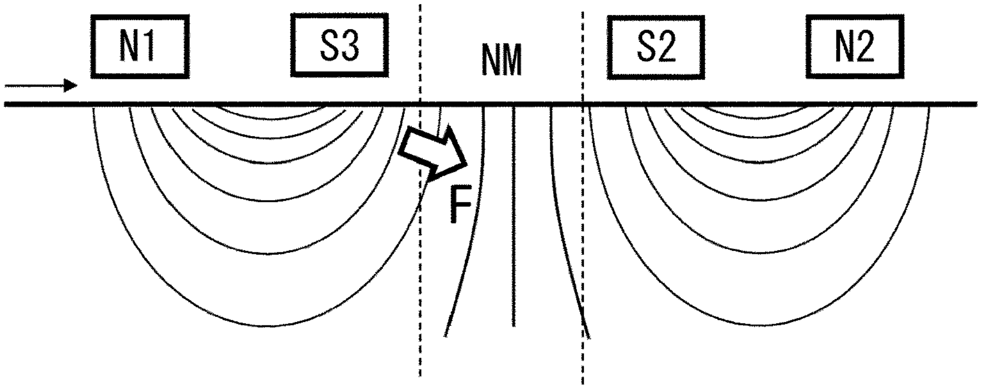

Part (a) of FIG. 4 is a schematic structural sectional view of a developing device according to a comparison example 2 in which a part thereof is enlarged, and part (b) of FIG. 4 is a schematic view showing a state of a magnetic field at a periphery of a low magnetic force section.

Figure 5:
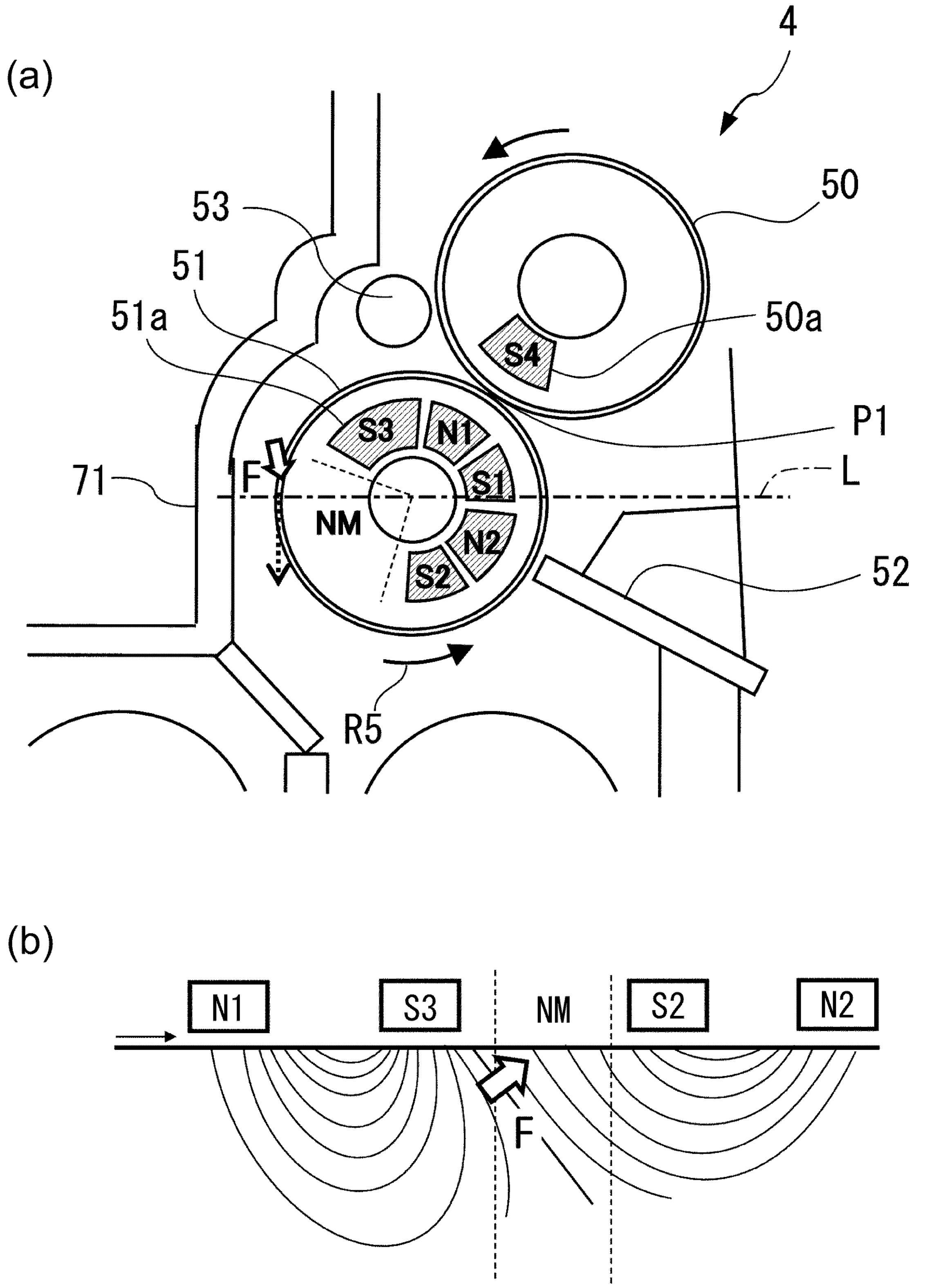

Part (a) of FIG. 5 is a schematic structural sectional view of a developing device according to the embodiment in which a part thereof is enlarged, and part (b) of FIG. 5 is a schematic view showing a state of a magnetic field at a periphery of a low magnetic force section.

Figure 6:
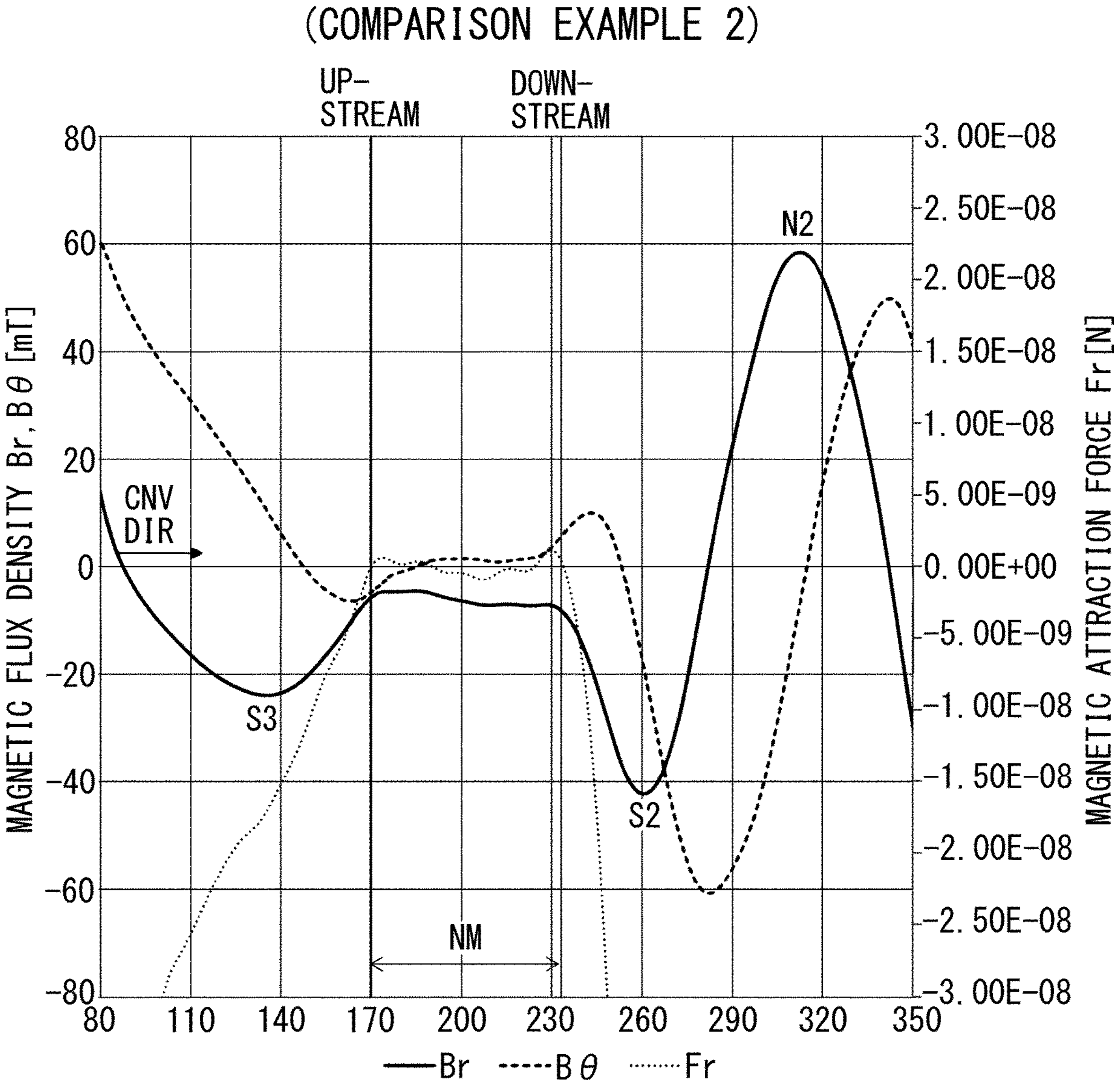

FIG. 6 is a graph showing a magnetic flux density distribution and a magnetic attraction force distribution of a magnet roller inside a supplying roller in the comparison example 2.

Figure 7:
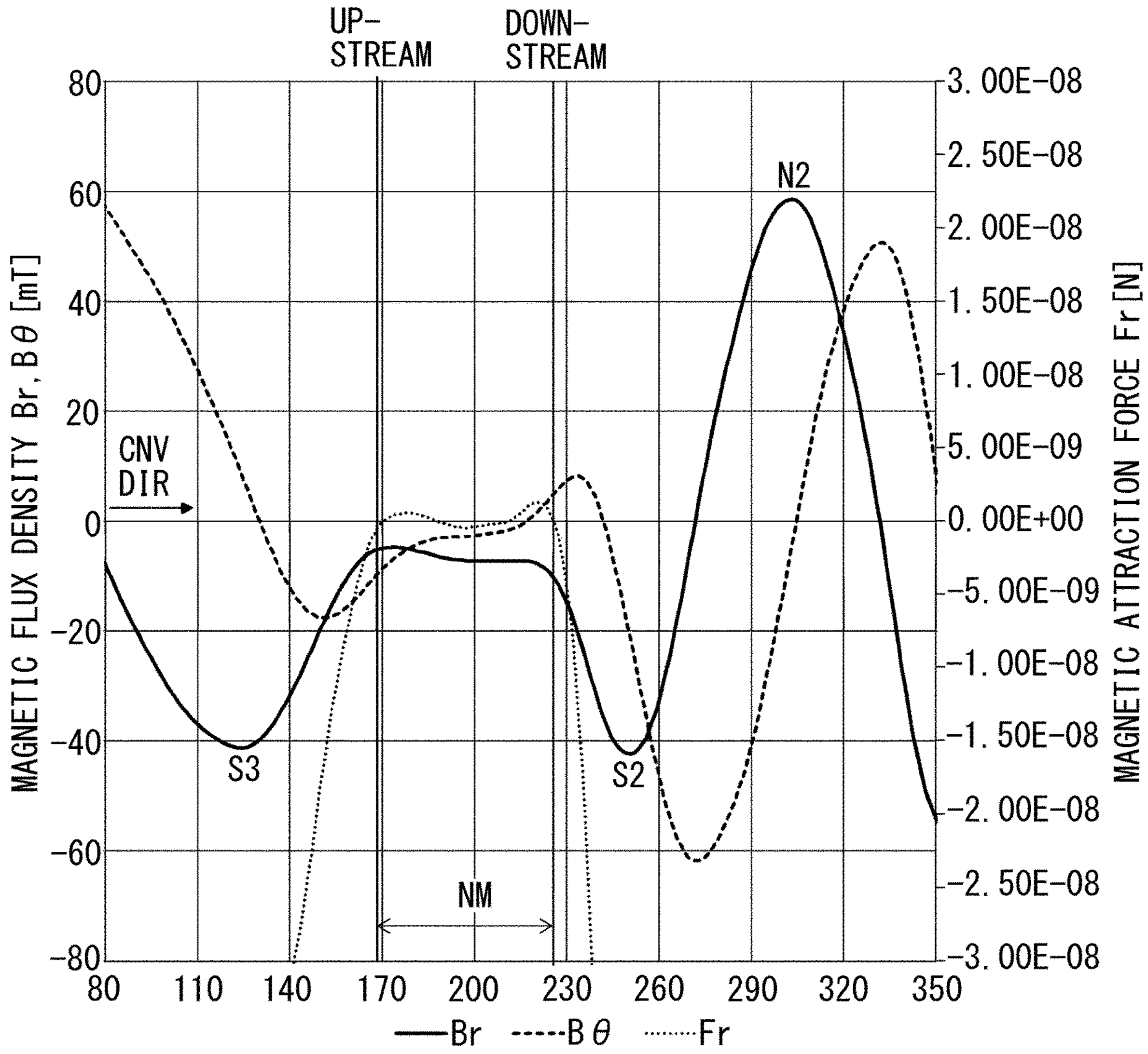

FIG. 7 is a graph showing a magnetic flux density distribution and a magnetic attraction force distribution of a magnet roller inside a supplying roller in an embodiment 1.

Figure 8:
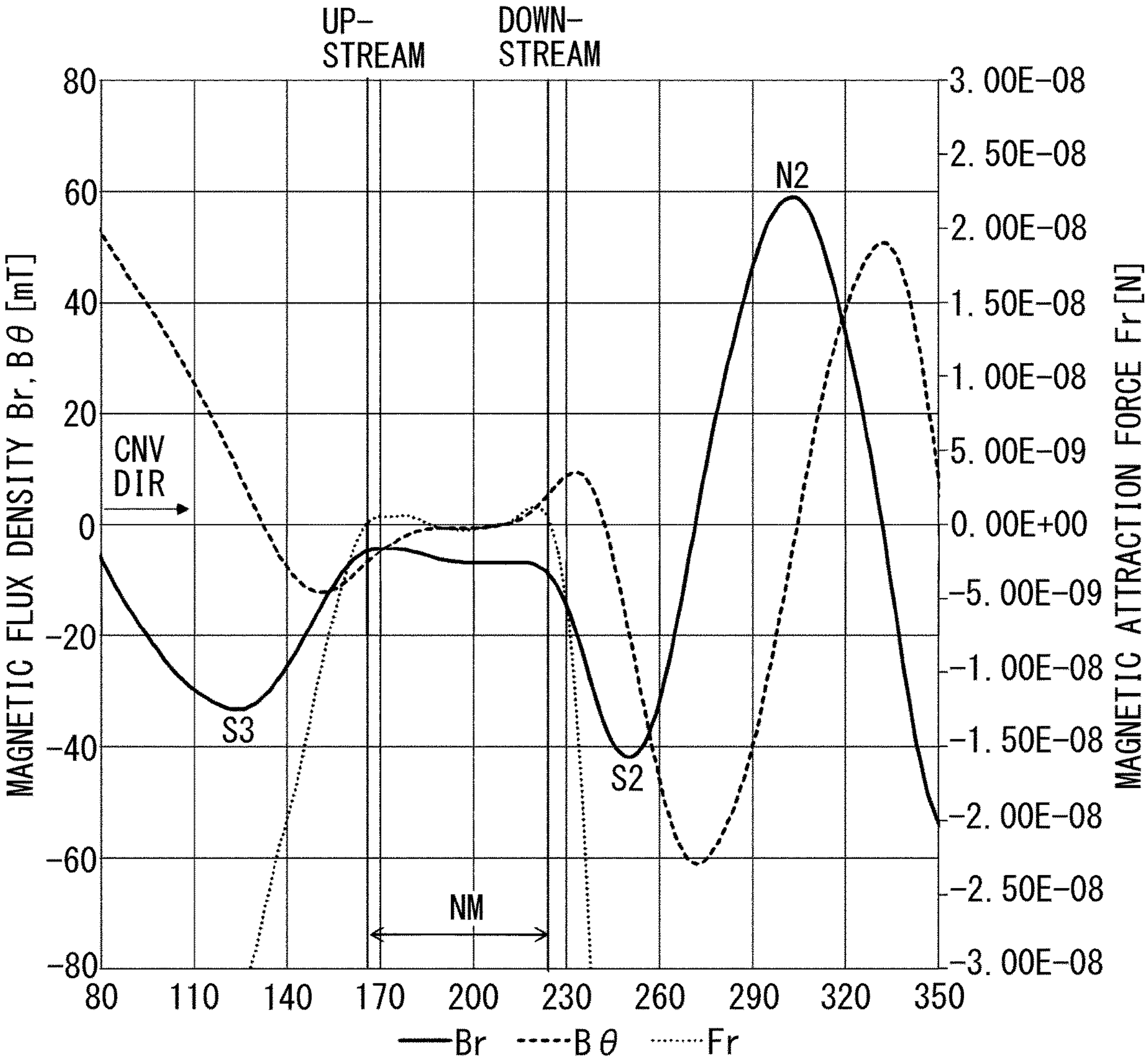

FIG. 8 is a graph showing a magnetic flux density distribution and a magnetic attraction force distribution of a roller magnet inside a supplying roller in an embodiment 2.

Figure 9:
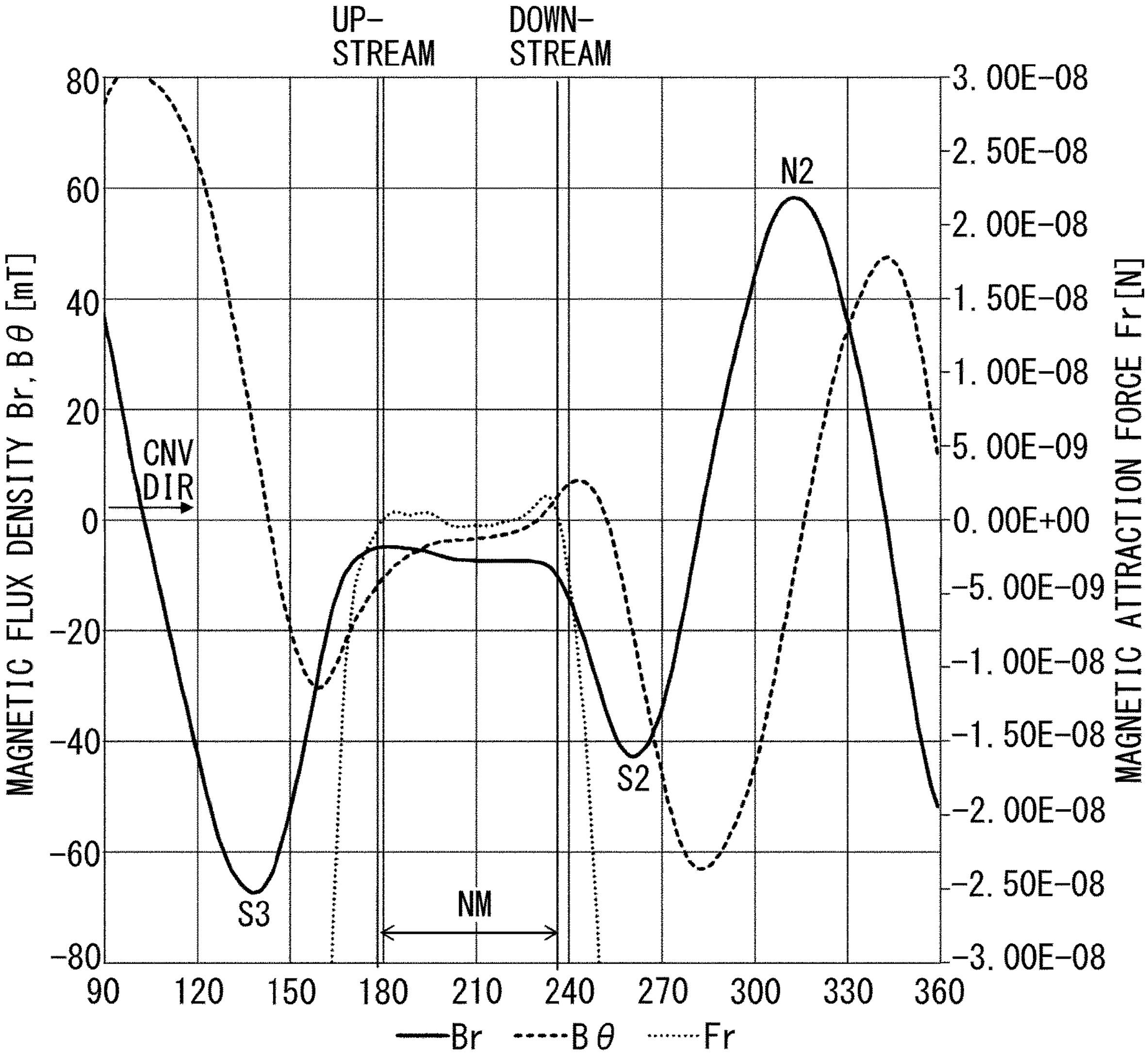

FIG. 9 is a graph showing a magnetic flux density distribution and a magnetic attraction force distribution of a magnet roller inside a supplying roller in an embodiment 3.

Figure 10:
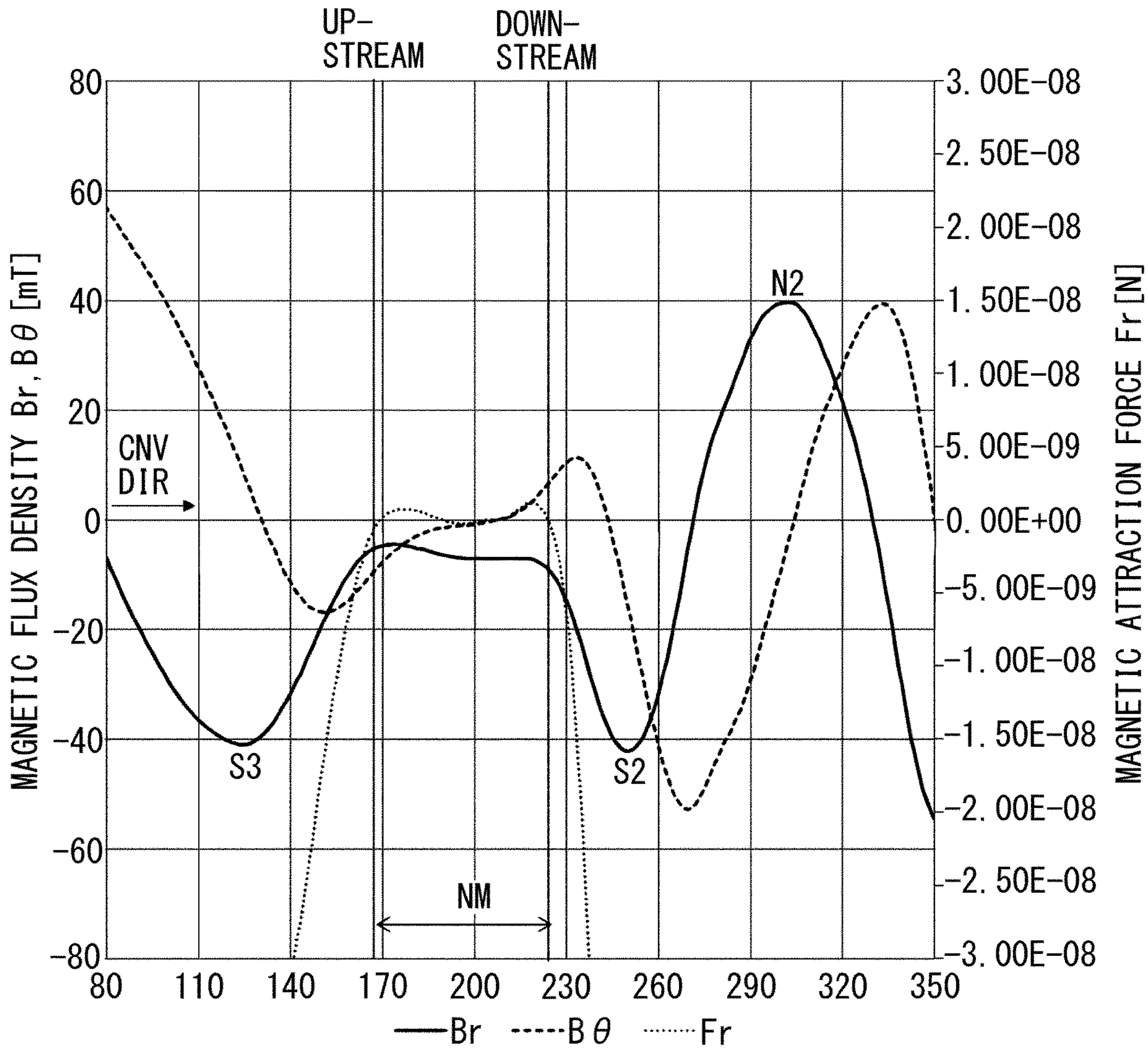

FIG. 10 is a graph showing a magnetic flux density distribution and a magnetic attraction force distribution of a magnet roller inside a supplying roller in an embodiment 4.

DESCRIPTION OF THE EMBODIMENTS

An embodiment will be described using FIGS. 1 to 7. Incidentally, in this embodiment, the case where a developing device is applied to a full-color printer of a tandem type as an example of an image forming apparatus is described.

[Image Forming Apparatus]

First, a schematic structure of an image forming apparatus 100 will be described using FIG. 1.

Figure 1:
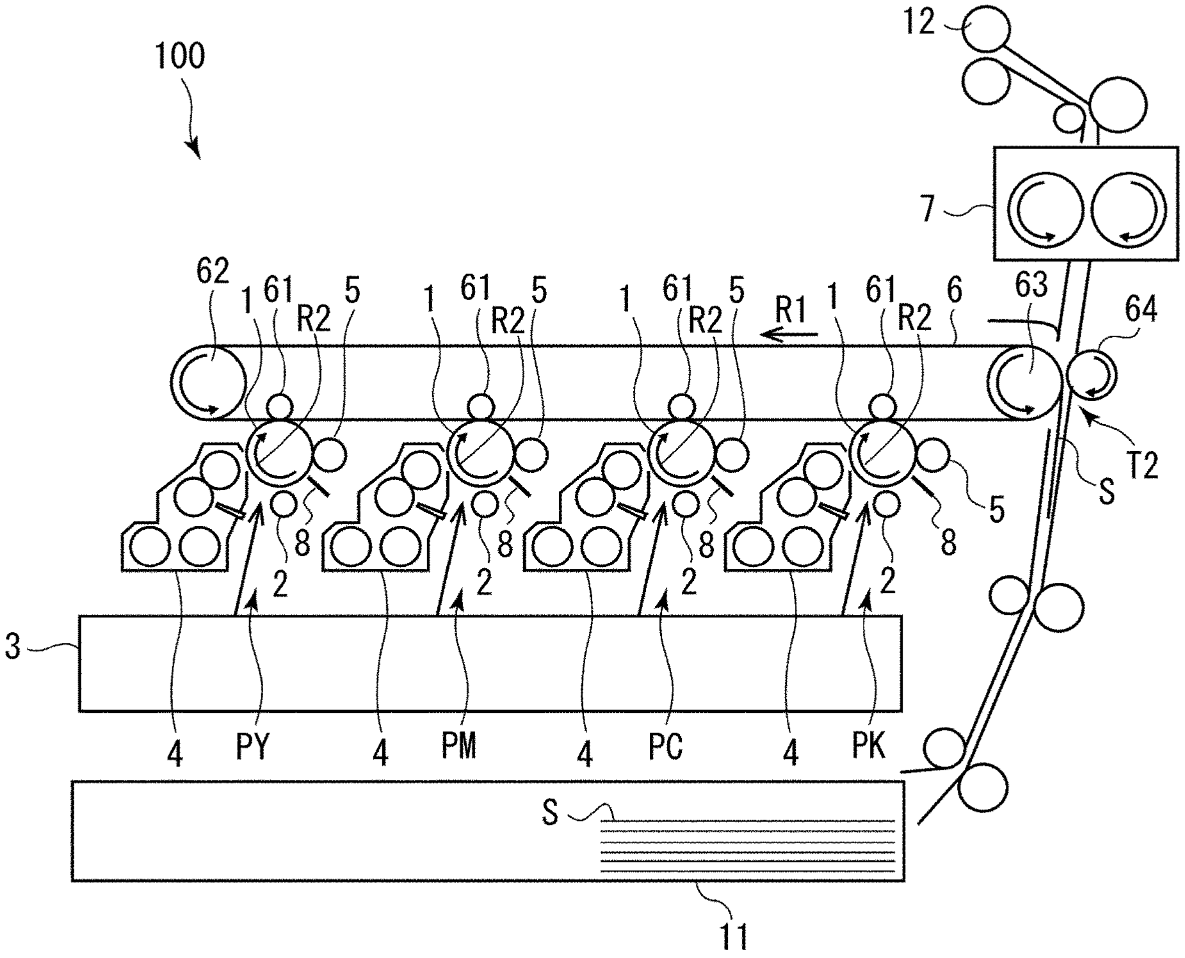
FIG. 1 is a schematic structural sectional view of an image forming apparatus according to an embodiment.

The image forming apparatus 100 shown in FIG. 1 is a full-color printer of an electrophotographic type including image forming portions PY, PM, PC and PK for four colors (yellow, magenta, cyan and black, respectively) in an apparatus main assembly. In this embodiment, an intermediary transfer tandem type in which the image forming portions PY, PM, PC, and PK are disposed along a rotational direction of an intermediary transfer belt 6 described later is employed. The image forming apparatus 100 forms a toner image (image) on a recording material S depending on an image signal from a host device such as a personal computer connected communicatably to the apparatus main assembly or to an unshown original reading device connected to the apparatus main assembly. As the recording material S, it is possible to cite a sheet material such as a sheet, a plastic film, or a cloth.

A toner image forming process will be described. First, the image forming portions PY, PM, PC and PK will be described. The image forming portions PY, PM, PC and PK are constituted substantially the same except that colors of toners are different from each other so as to be yellow, magenta, cyan and black, respectively. Therefore, in the following, the image forming portion PY for yellow will be described as an example, and other image forming portions PM, PC and PK will be omitted from description.

The image forming portion PY is constituted principally by the photosensitive drum 1, a charging device 2, a developing device 4, a discharging device 5, a cleaning device 8, and the like. In this embodiment, the intermediary transfer belt 6 is provided above the image forming portions PY, PM, PC and PK, and an exposure device 3 is provided below the image forming portions PY, PM, PC and PK. The photosensitive drum 1 as an image bearing member and a photosensitive member includes a photosensitive layer formed on an outer peripheral surface of an aluminum cylinder so as to have a negative charge polarity or a positive charge polarity, and is rotated at a predetermined process speed (peripheral speed) in an arrow R2 direction in embodiment 1.

The charging device 2 electrically charges the surface of the photosensitive drum 1 to, e.g., a uniform negative or positive dark-portion potential depending on a charging characteristic of the photosensitive drum 1. In this embodiment, the charging device 2 is a charging roller rotatably in contact with the surface of the photosensitive drum 1. After the charging, at the surface of the photosensitive drum 1, an electrostatic latent image (electrostatic image) is formed on the basis of image information by the exposure device (laser scanner) 3. The photosensitive drum 1 carries the formed electrostatic latent image and is circulated and moved, and the electrostatic latent image is developed with the toner by the developing device 4. Details of a structure of the developing device 4 will be described later. The toner in the developer consumed by image formation is supplied together with a carrier from an unshown toner cartridge.

The toner image developed from the electrostatic latent image is supplied with a predetermined pressing force and a primary transfer bias by a primary transfer roller 61 provided opposed to the photosensitive drum 1 through the intermediary transfer belt 6, and is primary-transferred onto the intermediary transfer belt 6. The surface of the photosensitive drum 1 after the primary transfer is discharged by the discharging device 5. The cleaning device 8 removes a residual matter such as transfer residual toner remaining on the surface of the photosensitive drum 1 after the primary transfer.

The intermediary transfer belt 6 is stretched by a stretching roller 62 and an inner secondary transfer roller 63. The intermediary transfer belt 6 is driven so as to be moved in an arrow R1 direction in FIG. 1 by the inner secondary transfer roller 63 which is also a driving roller. The image forming processes for the respective colors performed by the above-described image forming portions PY, PM, PC and PK are carried out at timings each when an associated color toner image is superposed on the upstream color toner image primary-transferred on the intermediary transfer belt 6 with respect to a movement direction of the intermediary transfer belt 6. As a result, finally, a full-color toner image is formed on the intermediary transfer belt 6 and is conveyed toward a secondary transfer portion T2. The secondary transfer portion T2 is a transfer nip formed by an outer secondary transfer roller 64 and a portion of the intermediary transfer belt 6 stretched by the inner secondary transfer roller 63. Incidentally, the transfer residual toner after passing through the secondary transfer portion T2 is removed from the surface of the intermediary transfer belt 6 by an unshown belt cleaning device.

Relative to the toner image forming process of the toner image sent to the secondary transfer portion T2, at a similar timing, a conveying (feeding) process of the recording material S to the secondary transfer portion T2 is executed. In this conveying process, the recording material S is fed from a sheet cassette 11 and is sent to the secondary transfer portion T2 in synchronism with the image forming timing. In the secondary transfer portion T2, a secondary transfer voltage is applied to the inner secondary transfer roller 63.

By the image forming process and the conveying process which are described above, in the secondary transfer portion T2, the toner image is secondary-transferred from the intermediary transfer belt 6 onto the recording material S. Thereafter, the recording material S is conveyed to a fixing device 7, and is heated and pressed by the fixing device 7, so that the toner image is melted and fixed on the recording material S. Thus, the recording material S on which the toner image is fixed is discharged on an unshown discharge tray by a discharging roller 12.

[Two-Component Developer]

Next, the developer used in this embodiment will be described. In this embodiment, as the developer, a two-component developer which contains non-magnetic toner particles (toner) and magnetic carrier particles (carrier) and which has a mixing coating ratio, of the toner to the carrier, of 8.0 weight % is used. The toner is colored resin particles containing a binder resin, a colorant, and other additives as desired, and onto a surface thereof, an external additive such as colloidal silica fine powder is externally added. The toner is, for example, a negatively chargeable or positively chargeable polyester resin material depending on a charging characteristic of the photosensitive drum 1 and is about 7.0 μm in volume-average particle size. The carrier comprises, for example, magnetic metal particles of, for example, iron, nickel, cobalt or the like, of which surface is oxidized, and is about 40 μm or more and about 50 μm or less in volume average particle size.

In this embodiment, as the developer, a developer including a carrier which has a weight-average particle size of 45 μm, which comprises Mn—Mg as a main component, and which has saturation magnetization of 60 emu/g as a value acquired by MSV method was used. As the toner, toner particles with an intermediate diameter of 7 μm in a volume distribution measured by a Coulter counter were used. Further, a mixture of the toner and the carrier in which a toner concentration is 12% was used as the developer. A charging characteristic of the toner is a positive charging property.

[Developing Device]

Figure 2:
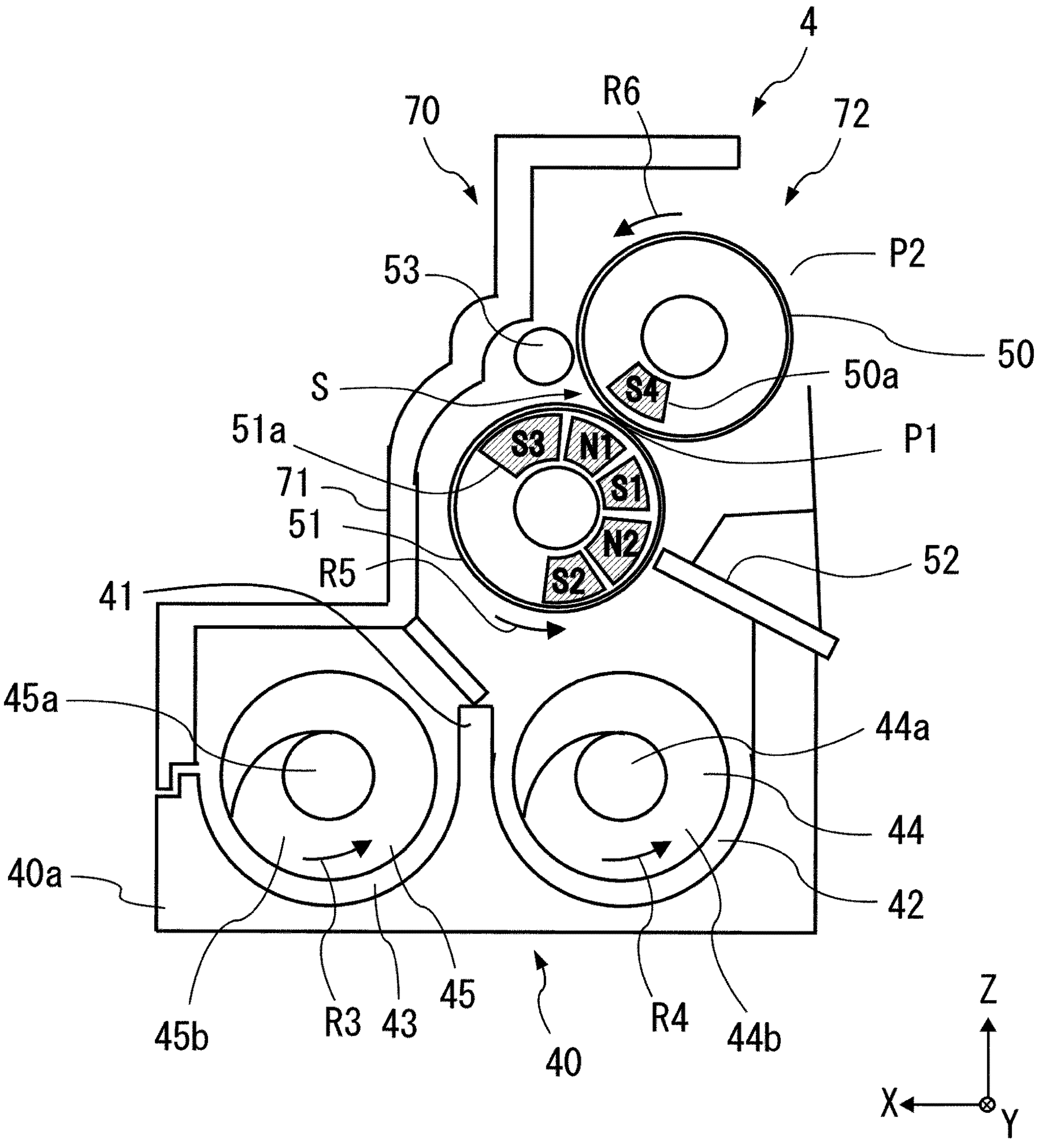
FIG. 2 is a schematic structural sectional view of a developing device according to the embodiment.

Next, the developing device 4 will be specifically described using FIG. 2. The developing device 4 in this embodiment is a developing device of a so-called touch-down developing type in which a thin layer of only the toner is formed on the developing roller 50 with a magnetic brush by the two-component developer formed on the supplying roller 51 and then development is carried out by causing the toner to fly onto the electrostatic latent image formed on the photosensitive drum 1 by a developing bias, obtained by superimposing a DC and an AC, which is applied to the developing roller 50.

As shown in FIG. 2, the developing device 4 includes the developing container 40, the developing roller 50 as the rotatable developing member, and the supplying roller 51 as the rotatable supplying member.

The developing container 40 includes a housing 70 and a developer accommodating portion 40*a* provided below the housing 70. The housing 70 includes a wall portion 71 and an opening 72. The wall portion 71 is provided in a position opposing a part of the supplying roller 51. In the case of this embodiment, the wall portion 71 is positioned on a side opposite from a regulating blade 52 described later while sandwiching the supplying roller 51 therebetween. In this position, the wall portion 71 is disposed so as to extend along an outer peripheral surface of the supplying roller 51. The opening 72 is formed in a position where the developing container 40 opposes the photosensitive drum 1, so that the developing roller 50 opposes the photosensitive drum 1 through the opening 72.

In the developer accommodating portion 40*a*, the developer containing the non-magnetic toner and the magnetic carrier is accommodated. The developer accommodating portion 40*a* includes a developing chamber 42 as a first chamber, a stirring chamber 43 as a second chamber, and a partition wall 41 as a partitioning wall. The stirring chamber 43 is disposed adjacent to the developing chamber 42 so as to overlap at least partially with the developing chamber 42 as viewed in a horizontal direction. The partition wall 41 partitions between the developing chamber 42 and the stirring chamber 43. The partition wall 41 is provided with an opening as a communicating portion for establishing communication between the developing chamber 42 and the stirring chamber 43 on each of opposite end sides with respect to a longitudinal direction (rotational axis direction of the developing roller 50 and the supplying roller 51). The developer accommodating portion 40*a* forms a circulation passage along which the developer is circulated between the developing chamber 42 and the stirring chamber 43 via the opening provided in the partition wall 41.

In this embodiment, the partition wall 41 is provided at a substantially central portion in the developer accommodating portion 40*a*. By this, the developer accommodating portion 40*a* is partitioned by the partition wall 41 so that the developing chamber 42 and the stirring chamber 43 are adjacent to each other in the horizontal direction. In the developing chamber 42 and the stirring chamber 43, a first feeding screw 44 and a second feeding screw 45 which are rotatable are provided, respectively, for stirring and circulating the developer.

The first feeding screw 44 as a first feeding member is disposed opposed substantially parallel to the supplying roller 51 along the rotational axis direction (longitudinal direction) of the supplying roller 51 at a bottom in the developing chamber 42 (in the first chamber). The first feeding screw 44 includes a rotation shaft 44*a* and a blade 44*b* provided helically at a periphery of the rotation shaft 44*a*. The second feeding screw 45 as a second feeding member is disposed substantially parallel to the first feeding screw 44 at a bottom in the stirring chamber 43 (in the second chamber). The second feeding screw 45 includes a rotation shaft 45*a* and a blade 45*b* provided helically at a periphery of the rotation shaft 45*a*.

The first feeding screw 44 and the second feeding screw 45 are rotated in an arrow R4 direction and an arrow R3 direction, respectively, so that the developer is fed in the developing chamber 42 and the stirring chamber 43, respectively. The developer fed by rotation of the first feeding screw 44 and the second feeding screw 45 is circulated between the developing chamber 42 and the stirring chamber 43 through the opening at each of opposite end portions of the partition wall 41. The toner is stirred by the first feeding screw 44 and the second feeding screw 45, whereby the toner is triboelectrically charged to a negative polarity or a positive polarity by friction with the carrier.

As shown in FIG. 2, the developing roller 50 and the supplying roller 51 are disposed above the developing chamber 42 and the stirring chamber 43 with respect to a vertical direction in the inside of the housing 70. The developing roller 50 is provided obliquely on the supplying roller 51 between the supplying roller 51 and the photosensitive drum 1 as viewed in the rotational axis direction of the supplying roller 51. That is, the developing roller 50 is disposed so that the rotational axis thereof is positioned above the rotational axis of the supplying roller 51. The supplying roller 51 and the developing roller 50 are disposed opposed to each other in a closest position P1 with the rotational axes thereof substantially parallel to each other. The closest position P1 is a position where the supplying roller 51 and the developing roller 50 oppose each other on a line connecting rotation centers of the supplying roller 51 and the developing roller 50.

The developing roller 50 opposes the photosensitive drum 1 on an opening 72 side of the housing 70. Each of the developing roller 50 and the supplying roller 51 is provided rotatably about the rotational axis thereof. Each of the developing roller 50 and the supplying roller 51 is rotationally driven in a counterclockwise direction (arrow R6 direction or arrow R5 direction) in FIG. 2. That is, the developing roller 50 and the supplying roller 51 are rotated in directions opposite to each other (opposite directions) in the closest position P1, and rotational speeds thereof are made variable by the driving portion 9.

The supplying roller 51 is a non-magnetic cylindrical roller rotatable in the counterclockwise direction in FIG. 2, and is provided rotatably at a periphery of a non-rotational cylindrical magnet roller 51*a* which is provided on an inner peripheral side and which is a magnetic field generating means and a second magnet. That is, the magnet roller 51*a* is non-rotationally fixed and disposed inside the supplying roller 51. The magnet roller 51*a* includes 5 pieces including, on a surface thereof opposing the supplying roller 51, a scooping pole (third magnetic pole) S2, a regulating pole (fourth magnetic pole) N2, a holding pole S1, a main pole (first magnetic pole) N1, and a peeling pole (second magnetic pole) S3 which are provided in a named order with respect to the rotational direction of the supplying roller 51. Incidentally, in this embodiment, the magnet roller having the 5 poles is used, but may be a magnet roller having poles other than the 5 poles, and for example, a magnet roller having 7 poles may also be used.

The main pole N1 is disposed in a position where the supplying roller 51 opposes the developing roller 50 and is different in polarity from a receiving pole S4 of a magnet roller 50*a* inside the developing roller 50 described later. The holding pole S1 is disposed upstream of and adjacent to the main pole N1 with respect to the rotational direction of the supplying roller 51 and is different in polarity from the main pole N1. The regulating pole N2 is disposed in a position upstream and adjacent to the holding pole S1 with respect to the rotational direction of the supplying roller 51 and in a position where a regulating blade 52 described later opposes the supplying roller 51, and is the same in polarity as the main pole N1. The scooping pole S2 is disposed upstream of and adjacent to the regulating pole N2 and is different in polarity from the regulating pole N2 and is a magnetic pole for scooping the developer from the developer accommodating portion 40*a* to the supplying roller 51. Specifically, the scooping pole S2 is disposed opposed to the first feeding screw 44 at an upper portion of the developing chamber 42. The peeling pole (peeling-off pole) S3 is disposed upstream of and adjacent to the scooping pole S2 with respect to the rotational direction of the supplying roller 51 and is the same in polarity as the scooping pole S2. The scooping pole S2, the regulating pole N2, the holding pole S1, the main pole N1, and the peeling pole S3 are disposed adjacent in a named order with respect to the rotational direction of the supplying roller 51.

The supplying roller 51 carries the developer containing the non-magnetic toner and the magnetic carrier and rotationally conveys the developer to the closest position P1 to the developing roller 50. That is, the supplying roller 51 is disposed opposed to the developing roller 50 and supplies the developer inside the developer accommodating portion 40*a* (inside the developing container) to the developing roller 50. The supplying roller 51 includes a plurality of recessed portions, each having a groove shape, provided along a rotational axis thereof at an outer peripheral surface thereof, and these recessed portions are disposed periodically in a circumferential direction of the supplying roller 51. These recessed portions assist conveyance of the developer carried on the supplying roller 51.

The regulating blade 52 as a regulating member is disposed upstream, with respect to the rotational direction of the supplying roller 51, of a position (closest position P1) where the supplying roller 51 opposes the developing roller 50, and regulates an amount of the developer carried on the supplying roller 51. That is, the regulating blade 52 is a plate-like member and is provided in the developing container 40 so that a free end thereof opposes the outer peripheral surface of the supplying roller 51 in which a regulating pole N2 of the magnetic roller 51*a* is located. A predetermined gap is provided between the free end of the regulating blade 52 and an outer peripheral surface of the supplying roller 51. Further, a magnetic chain of the developer carried on the surface of the supplying roller 51 is cut by the regulating blade 52, so that a layer thickness of the developer is regulated. Specifically, the regulating blade 52 comprises a metal plate (for example, a stainless steel plate) provided along a longitudinal direction of the supplying roller 51, and the developer passes through between a free end portion of the regulating blade 52 and the supplying roller 51, so that the developer is conveyed in a state in which an amount thereof is regulated to a certain amount. The regulating blade 52 is formed in an L-shape by a magnetic member such as SUS 430 in a thickness of about 1.5 mm, for example.

The developing roller 50 is disposed opposed to the photosensitive drum 1 and conveys the developer to a developing position where the electrostatic latent image formed on the photosensitive drum 1 is developed by rotation of the developing roller 50. That is, the developing roller 50 is a non-magnetic roller rotatable in the counterclockwise direction in FIG. 2 and is provided rotatably around the magnet roller 50*a* as a first magnet which includes a single receiving pole (fifth magnetic pole) S4 provided on an inner peripheral surface side and which does not rotate. The developing roller 50 is capable of developing the electrostatic latent image on the photosensitive drum 1 in a developing region P2 which is an opposing region to the photosensitive drum 1 by being rotated while carrying the toner. The supplying roller 51 and the developing roller 50 oppose each other in the closest position P1 therebetween with a predetermined gap. The receiving pole S4 of the magnet roller 50*a* of the developing roller 50 is different in polarity from the main pole N1 opposing the receiving pole S4 by way of the supplying roller 51 and the developing roller 50.

To the supplying roller 51, a supplying bias in the form of a superimposition of a DC voltage and an AC voltage is applied. Further, also to the developing roller 50, a developing bias in the form of superimposition of a DC voltage and an AC voltage is applied. The developing bias and the supplying bias are applied from a bias power source as an example of a voltage applying portion, to the developing roller 50 and the supplying roller 51, respectively, through a bias control circuit.

That is, the bias power source applies a voltage including a DC component and an AC component to between the developing roller 50 and the supplying roller 51. By a potential difference between the voltage applied to the supplying roller 51 and the voltage applied to the developing roller 50, the toner is supplied from the supplying roller 51 to the developing roller 50, and in addition, by an effect of the AC component, the toner on the developing roller 50 after the development is collected by the supplying roller 51.

That is, toner remaining on the developing roller 50 without being used for development is conveyed to the closest position P1, and is rubbed by a magnetic chain on the supplying roller 51 and is collected by the supplying roller 51. The magnetic chain is peeled off from the supplying roller 51 in a peeling region (low magnetic force section) created by repulsion between the peeling pole S3 and the scooping pole S2 which are disposed on a downstream side of the rotational direction of the supplying roller 51. The developer peeled off developing devices into the developing chamber 42 and is stirred and conveyed together with the developer circulating in the developing container 40, and then is attracted again to the scooping pole S2 and is conveyed by the supplying roller 51.

A toner shielding member 53 is an electroconductive cylindrical member, and is provided opposed to the developing roller 50. In addition, to the toner shielding member 53, a voltage of the same potential as a voltage applied to the supplying roller 51 is applied. By this, the toner passing through between the toner shielding member 53 and the developing roller 50 is pressed against the developing roller 50, and therefore, a passing amount thereof is suppressed. As a result, it is possible to suppress that scattering toner generating in the closest position P1 between the supplying roller 51 and the developing roller 50 passes through between the toner shielding member 53 and the developing roller 50 and leaks out to the outside of the developing device 4 through the opening 72 and then an inside of the image forming apparatus 100 is contaminated with the scattering toner.

As described above, the magnet roller 51*a* inside the supplying roller 51 includes the main pole (developing pole or receiving pole) N1 in a position substantially opposing the developing roller 50. Further, when a counterclockwise direction from this main pole N1 is taken as a rotational direction, the holding pole (conveying pole) S1 exists on a side upstream of the main pole N1 with respect to the rotational direction, the regulating pole (chain cutting pole) N2 is disposed in a position substantially opposed to the regulating blade 52, and on a side upstream of the regulating pole N2, the scooping pole S2 and the peeling pole (separation pole) S3 are disposed in this order. The scooping pole S2 and the peeling pole S3 have the same polarity, and a low magnetic force section is formed between a peak position of the magnetic flux density of the scooping pole S2 and a peak position of the magnetic flux density of the peeling pole S3.

Here, the low magnetic force section refers to a section in which lines of magnetic force exerted on the carrier in the developer on the supplying roller 51 in the direction of the developing roller 50 by the magnet roller 51*a* inside the supplying roller 51 is substantially 0. In this embodiment, the low magnetic force section is a section in which an absolute value of a magnetic flux density Br which is a normal direction component of a magnetic flux density B (this magnetic flux density Br is also referred to as a normal direction magnetic flux density Br) is 5 [mT] or less.

The magnet roller 50*a* inside the developing roller 50 includes only one pole, and in a position substantially opposing the supplying roller 51, the receiving pole S4 providing a relationship thereof with the main pole N1 of the supplying roller 51 such that polarities of these poles S4 and N1 are different from each other. In this embodiment, the main pole N1 of the supplying roller 51 and the receiving pole S4 of the developing roller 50 are disposed with respect to the closest position P1 between the supplying roller 51 and the developing roller 50 in the following positional relationship. That is, the main pole N1 is disposed so that the peak position of the magnetic flux density thereof is somewhat downstream of the closest position P1 with respect to the rotational direction R5 of the supplying roller 51. Further, the receiving pole S4 of the developing roller 50 is disposed so that the peak position of the magnetic flux density thereof is somewhat upstream of the closest position P1 with respect to the rotational direction R6 of the developing roller 50. This is because ghost and carrier deposition are prevented.

Further, the peak position of the magnetic flux density of the regulating pole N2 of the supplying roller 51 is provided in a position deviated upstream of a position opposing the regulating blade 52 by 3° to 5° with respect to the rotational direction R5 of the supplying roller 51.

Here, motion of the developer on the supplying roller 51 and the developing roller 50 in the developing device 4 of this embodiment will be described. The developer existing in the developing chamber 42 is scooped up to the supplying roller 51 by the scooping pole S2 of the supplying roller 51. The scooped developer is carried and conveyed by the supplying roller 51 with rotation of the supplying roller 51 in the arrow R5 direction, and a thickness of a developer layer is regulated by the regulating blade 52 disposed substantially opposed to the regulating pole N2. Thereafter, with rotation of the supplying roller 51, the developer is conveyed to the holding pole S1 and the main pole N1.

On the main pole N1 substantially opposing the developing roller 50, the toner in the developer is moved from the supplying roller 51 to the developing roller 50 by an effect of the voltages applied to the supplying roller 51 and the developing roller 50, respectively. The developing roller 50 is rotated in the arrow R5 direction and conveys the toner to a position opposing the photosensitive drum 1, so that the electrostatic latent image on the photosensitive drum 1 is developed with the toner.

On the main pole N1, the developer on the supplying roller 51 short in amount of the toner therein by movement of the toner to the developing roller 50 is conveyed to the peeling pole S3 with rotation of the supplying roller 51, and then the developer is peeled off from the supplying roller 51 in the low magnetic force section formed between the peeling pole S3 and the scooping pole S2. The developer peeled off drops into the developing chamber 42. The dropped developer is mixed with the developer existing in the developing chamber 42 by a stirring effect of the first feeding screw 44, so that short in toner is eliminated, and then the developer is scooped up again to the supplying roller 51 by the scooping pole S2 of the supplying roller 51.

At this time, when the movement of the developer, peeled off from the supplying roller 51, with rotation of the supplying roller 51 such that the peeled developer is scooped up again to the supplying roller 51 as it is by the scooping pole S2 of the supplying roller 51 without being mixed with the developer existing in the developing chamber 42 occurs, there is a liability that a lowering in quality of an output image due to insufficient toner in the developer occurs. This embodiment aims at suppressing the occurrence of such a developer movement with rotation of the supplying roller 51, and in the following, a constitution of this embodiment will be specifically described with comparison examples. Incidentally, in the following, in the case where "upstream" is simply referred to, the term "upstream" refers to "upstream" with respect to the rotational direction of the supplying roller 51, and in the case where "downstream" is simply referred to, the term "downstream" refers to "downstream" with respect to the rotational direction of the supplying roller 51.

Parts (a) and (b) of FIG. 3 show a developing device 4A of a comparison example 1, parts (a) and (b) of FIG. 4 show a developing device 4B of a comparison example 2, and parts (a) and (b) of FIG. 5 show a developing device 4 of an embodiment 1 according to this embodiment. Part (a) of FIG. 3, part (a) of FIG. 4, and part (a) of FIG. 5 are sectional views each in which a periphery of an associated supplying roller 51 is enlarged. Further, in each of part (a) of FIG. 4, part (a) of FIG. 4, and part (a) of FIG. 5, a low magnetic force section formed between the peak position of the magnetic flux density of the peeling pole S3 and the peak position of the magnetic flux density of the scooping pole S2 (i.e., with respect to the rotational direction of the supplying roller 51, a region downstream of a position where the normal direction magnetic flux density Br of the peeling pole S3 becomes maximum and upstream of a position where the normal direction magnetic flux density Br of the scooping pole S2 becomes maximum) was indicated as a range NM defined by broken lines (in the following, this range NM is referred to as a low magnetic force section NM).

Part (b) of FIG. 3, part (b) of FIG. 4, and part (b) of FIG. 5 are schematic views showing states of magnetic fields formed by magnet rollers 51*a*1, 51*a*2, and 51*a*, respectively. In each of these schematic views, an associated state of the magnetic field in the low magnetic force section NM was shown. Further, in each of these schematic views, a surface of the cylindrical supplying roller 51 of each of the developing devices 4, 4A, and 4B is indicated for convenience by a rectilinear line.

Comparison Example 1

First, using parts (a) and (b) of FIG. 3, the developing device 4A of the comparison example 1 will be described. As described above, the developer on the supplying roller 51 short in amount of the toner due to movement of the toner to the developing roller 50 is conveyed to the peeling pole S3 with rotation of the supplying roller 51, and is peeled off from the supplying roller 51 in the low magnetic force section NM formed between the peeling pole P3 and the scooping pole S2.

Specifically, the developer on the supplying roller 51 is conveyed to the peeling pole S3 with rotation of the supplying roller 51 and is peeled off from the supplying roller 51 in a position on an upstream side in the low magnetic force section NM. In the developing device 4A of the comparison example 1, a most upstream position of the low magnetic force section NM is positioned below a rotation center of the supplying roller 51 in a vertical direction. Accordingly, in the developing device 4A of the comparison example 1, the developer is to be peeled off at a position below the rotation center of the supplying roller 51. In the case where the developer is peeled off at the position below the rotation center of the supplying roller 51, the developer movement with rotation of the supplying roller 51 such that the developer is attracted again to the supplying roller 51 by a magnetic force of the scooping pole S2 existing on the downstream side of the rotational direction of the supplying roller 51 is liable to occur.

A degree of ease of the occurrence of the developer movement with rotation of the supplying roller 51 also depends on a manner of flying of the developer, peeled off in the low magnetic force section NM in which direction. This point will be described in the following. As shown in part (b) of FIG. 3, in the case of the comparison example 1, lines of magnetic force extend so as to be repelled to each other between the peeling pole S3 and the scooping pole S2. That is, the lines of magnetic forces extended from the surface of the supplying roller 51 extend in a direction of the peeling pole S3 on an upstream side of the low magnetic force section NM and a direction of the scooping pole S2 on a downstream side of the low magnetic force section NM, respectively. In the case where magnetic flux densities and half-value widths of the two magnetic poles (the peeling pole S3 and the scooping pole S2 in the case of this comparison example 1) forming the low magnetic force section NM are not greatly different from each other, the lines of magnetic forces extend in such a manner.

In general, the magnetic brush of the developer on the supplying roller 51 is formed along the lines of magnetic force. The lines of magnetic force can be said to express a locus of the magnetic brush conveyed on the supplying roller 51, and the magnetic brush advances toward a normal direction of the lines of magnetic force (on a downstream side of the rotational direction of the supplying roller 51). Accordingly, the developer peeled off on the upstream side of the low magnetic force section NM flies in the normal direction (arrow F direction in FIG. 3) of the lines of magnetic force (directed toward the downstream side of the rotational direction of the supplying roller 51) in a position thereof. The arrow F direction roughly coincides with the rotational direction of the supplying roller 51. Accordingly, as in the comparison example 1, in the case where the developer is peeled off in a position below the rotation center of the supplying roller 51, the developer peeled off flies in the rotational direction of the supplying roller 51, and therefore, the developer movement with rotation of the supplying roller 51 such that the developer peeled off is attracted again to the supplying roller 51 by the magnetic force of the scooping pole S2 existing on the downstream side of the rotational direction of the supplying roller 51 is liable to occur. Particularly, with speed-up of the image forming apparatus, in the case where the supplying roller 51 is rotated at a high speed, the developer movement with rotation of the supplying roller 51 is move liable to occur.

Comparison Example 2

The developing device 4B of the comparison example 2 will be described using parts (a) and (b) of FIG. 4. In the developing device 4B of the comparison example 2, a most upstream position of a low magnetic force section NM formed between the peeling pole S3 and the scooping pole S2 is positioned on a side above the rotation center of the supplying roller 51 with respect to the vertical direction, and this point is different from the comparison example 1. On the other hand, a state of the magnetic field in the low magnetic force section MN is roughly similar to the state in the comparison example 1. This is because magnetic flux densities and half-value widths of the two magnetic poles (the peeling pole S3 and the scooping pole S2 in this comparison example 2) forming the low magnetic force section NM are not greatly different from those in the comparison example 1.

A direction in which the developer peeled off on the upstream side of the low magnetic force section NM flies was indicated by an arrow F in parts (a) and (b) of FIG. 4. As viewed in part (a) of FIG. 4, by positioning the most upstream position of the low magnetic force section NM on the side above the rotational direction of the supplying roller 51, a flying direction of the developer peeled off is directed toward a direction in which the developer is separated from the scooping pole S2 (in the horizontal direction), so that it would be considered that the developer movement with rotation of the supplying roller 51 does not readily occur.

However, according to study of the present inventor, in the developing device 4B of the comparison example 2, the developer movement with rotation of the supplying roller 51 was not necessarily improved. This would be considered for the following reason. In the developing device 4B of the comparison example 2, the wall portion 71 of the housing 70 exists so as to extend along the supplying roller 51. This constitution is employed for effective utilization of a space or the like and is a general constitution.

Thus, when the wall portion 71 of the housing 70 exists so as to extend along the supplying roller 51, as indicated by a dotted-line arrow in part (a) of FIG. 4, there is a liability that the developer peeled off from the supplying roller 51 flies in the arrow F direction and thereafter hits the wall portion 71 and rebounds, and then flies again in the direction of the supplying roller 51.

Further, as viewed in the schematic view of part (b) of FIG. 4 showing the state in the periphery of the low magnetic force section NM of the developing device 4B of the comparison example 2, lines of magnetic force extend so as to be repelled to each other between the peeling pole S3 and the scooping pole S2. That is, each of the lines of magnetic force extending from the surface of the supplying roller 51 extends in a direction of the peeling pole S3 on the upstream side of the low magnetic force section NM. For that reason, a normal direction (arrow F direction in part (b) of FIG. 4) to the lines of magnetic force (directed toward the downstream side of the rotational direction of the supplying roller 51) is somewhat directed in a direction away from the surface of the supplying roller 51. In the direction away from the surface of the supplying roller 51, the wall portion 71 of the housing 70 exists, and therefore, the developer peeled off from the supplying roller 51 is liable to fly toward a direction of the wall portion 71 and is liable to be rebounded by the wall portion 71. Thus, when the rebound from the wall portion 71 occurs, the developer movement with rotation of the supplying roller 51 is liable to occur in the case where the speed-up of the image forming apparatus is realized or in the like case, so that there is a possibility of an occurrence of a lowering in quality of an output image.

Embodiment 1

Next, using parts (a) and (b) of FIG. 5, the developing device 4 of the embodiment 1 which is a constitution of this embodiment will be described. In the developing device 4 of the embodiment 1, a most upstream position of a low magnetic force section NM formed between the peeling pole S3 and the scooping pole S2 is positioned on a side above the rotation center of the supplying roller 51 with respect to the vertical direction, and this point is the same as the comparison example 2. By this, similarly as in the comparison example 2, the flying direction of the developer peeled off is directed in the direction away from the scooping pole S2 (in the horizontal direction), so that the developer movement with rotation of the supplying roller 51 can be made less liable to occur.

On the other hand, a state of the low magnetic force section NM is largely different between the embodiment 1 and the comparison example 2. As shown in part (b) of FIG. 2, in the comparison example 2, each of the lines of magnetic force extending from the surface of the supplying roller 51 extended so as to be repelled to each other, and extended in the direction of the peeling pole S3 on the upstream side of the low magnetic force section NM and in the direction of the scooping pole S2 on the downstream side of the low magnetic force section NM. On the other hand, as shown in part (b) of FIG. 5, in the embodiment 1, the lines of magnetic force extend in the direction of the scooping pole S2 irrespective of a place. This is because in the case of the comparison example 2, the lines of magnetic force roughly extend in the direction of the upstream main pole N1 from the peeling pole S3 and in the direction of the downstream regulating pole N2 from the scooping pole S2, whereas in the case of the embodiment 1, the lines of magnetic force extend toward the regulating pole N2 not only from the scooping pole S2 but also from the peeling pole S3.

In the case of the comparison example 2, the magnetic flux densities and the half-value widths of the two magnetic poles (the peeling pole S3 and the scooping pole S2) forming the low magnetic force section NM are not largely different from each other. On the other hand, in the case of the embodiment 1, the magnetic flux densities and the half-value widths of the two magnetic poles (the peeling pole S3 and the scooping pole S2) forming the low magnetic force section NM are largely different from each other, and the magnetic flux density and the half-value width of the peeling pole S3 are larger than the magnetic flux density and the half-value width of the scooping pole S2. For this reason, in the embodiment 1, different from the comparison example 2, it would be considered that the lines of magnetic force extend also from the peeling pole S3 toward the regulating pole N2 existing downstream of the scooping pole S2.

According to study by the present inventor, in the developing device 4 of the embodiment 1 as described above, even in the case where the wall portion 71 of the housing 70 exists so as to extend along the supplying roller 51, different from the comparison example 2, the developer movement with rotation of the supplying roller 51 does not readily occur. This is for the following reason.

In part (b) of FIG. 5, a state of the magnetic field in the periphery of the low magnetic force section NM in the case of the embodiment 1 is shown. As described above, the magnetic brush of the developer on the supplying roller 51 is formed along the lines of magnetic force, and the developer peeled off on the upstream side of the low magnetic force section NM flies in the normal direction (arrow F direction in part (b) of FIG. 5) to the lines of magnetic force (directed toward the upstream side of the rotational direction of the supplying roller 51) in an upstream portion of the low magnetic force section NM. In the case of the comparison example 2 shown in parts (a) and (b) of FIG. 4, the arrow F direction was directed in a direction away from the surface of the supplying roller 51. On the other hand, in the case of the embodiment 1 shown in parts (a) and (b) of FIG. 5, an extending manner of the lines of magnetic force is different from that in the comparison example 2, and the arrow F direction is directed in a direction toward the surface of the supplying roller 51.

Accordingly, in the case of the comparison example 2, the developer peeled off on the upstream side of the low magnetic force section NM separated from the surface of the supplying roller 51 and then flied toward the wall portion 71 of the housing 70. On the other hand, in the case of the embodiment 1, the developer receives a force toward the direction of the surface of the supplying roller 51, so that different from the case of the comparison example 2, flying of the developer toward the wall portion 71 does not readily occur. In actuality, in the case of the embodiment 1, the developer separates from the supplying roller 51 while receiving a force in a direction in which the developer is pressed toward the surface of the supplying roller 51, so that the developer separated from the supplying roller 51 assumes a locus as indicated by a dotted-line arrow in part (a) of FIG. 5. As a result, in the developing device 4 of the embodiment 1, even in the case where the wall portion 71 of the housing extends along the supplying roller 51, it would be considered that different from the case of the comparison example 2, the developer movement with rotation of the supplying roller 51 does not readily occur.

Incidentally, in order to obtain a suppressing effect of the developer movement with rotation of the supplying roller 51, it is important that the position of the most upstream position of the low magnetic force section NM formed between the peeling pole S3 and the scooping pole S2 is positioned above the rotation center of the supplying roller 51 in terms of a vertical component. This is because otherwise, there is a liability that the developer flies in the direction of the scooping pole S2. As regards the most upstream position of the low magnetic force section NM, an effect can be obtained if the most upstream position exists above the rotation center of the supplying roller 51 in the vertical direction even slightly. However, with respect to the rotational direction of the supplying roller 51, the most upstream position of the low magnetic force section NM may preferably be positioned upstream of a horizontal line L passing through the rotation center of the supplying roller 51 by 3° or more, more preferably 6° or more.

[Magnetic Flux Density Distribution]

Next, a magnetic flux density distribution of the surface of the supplying roller 51 in the periphery of the low magnetic force section NM formed between the peeling pole S3 and the scooping pole S2 of the supplying roller 51 of the embodiment 1 will be described with reference to FIGS. 6 and 7 while comparing the embodiment 1 with the comparison example 2. FIGS. 6 and 7 are schematic views showing distributions of a magnetic flux density Br in a normal direction and a magnetic flux density Be in a tangential direction on each of surfaces of the supplying rollers 51 incorporating the magnet roller 51*al* in the comparison example 2 and the magnet roller 51*a* in the embodiment 1, respectively.

Incidentally, the magnetic flux density Br accurately refers to a normal direction component of a magnetic flux density B normal to the supplying roller 51. Hereinafter, the "magnetic flux density Br in the normal direction" is simply called the "magnetic flux density" in accordance with the custom in some cases. In the case where the magnetic flux density is simply called the magnetic flux density, the magnetic flux density refers to the "magnetic flux density Br in the normal direction on the surface of the supplying roller 51. The magnetic flux density Br in the normal direction on each of the surfaces of the supplying rollers 51 in the embodiment 1 and in the comparison example 2 was measured using a magnetic field measuring device ("MS-9902", manufactured by F. W. BELL) in which a distance between a probe which is a member of the magnetic field measuring device and the surface of the developing sleeve 24 is about 100 μm.

Further, in FIGS. 6 and 7, magnetic attraction forces (i.e., magnetic attraction forces in the normal direction on the surfaces of the supplying rollers 51) Fr by which the developer (carrier) is attracted to center directions of the supplying rollers 51 are also schematically shown together. In the following, the "magnetic attraction force Fr in the center direction of the supplying roller 51" is simply called the "magnetic attraction force" in some cases. In the case where the magnetic attraction force is simply called the "magnetic attraction force", the magnetic attraction force refers to the "magnetic attraction force F2 in the normal direction on the surface of the supplying roller 51". The magnetic attraction force Fr of supplying roller 51 can be derived from the magnetic flux density Br in the normal direction and is represented by the following formula 1.

$$F_r \frac{\mu - \mu_o}{\mu_o(\mu + 2\mu_o)} 2\pi b^3 \left( B_r \frac{\partial B_r}{\partial r} + B_\theta \frac{\partial B_\theta}{\partial r} \right) \quad \text{(formula 1)}$$

In the formula 1, u represents (magnetic) permeability of a magnetic carrier, $\mu_0$ represents space permeability, and b represents a radius of the magnetic carrier. The magnetic flux density Bθ on the surface of the supplying roller 51 is acquired from the following formula 2 by using a value of the magnetic flux density Br in the normal direction measured by the above-described method.

$$B_\theta = -\frac{\partial A_z(r, \theta)}{\partial r} \left( A_z(R, \theta) = \int_0^\theta R B_r d\theta \right) \quad \text{(formula 2)}$$

In FIGS. 6 and 7, the magnetic flux density Br in the normal direction in the comparison example 2 and the magnetic flux density Br in the normal direction in the embodiment 1 were indicated by solid lines, respectively, and associated magnetic attraction forces Fr (dotted lines) were shown together in second axes, respectively. The low magnetic force section NM refers to a region in which the magnetic attraction force Fr is 0 or less or about 0, but a variation in magnetic attraction force Fr occurs near 0 and thus the low magnetic force section NM is not readily defined in some cases. For this reason, in this embodiment, the "low magnetic force section NM" is defined as a section between a most upstream position and a most downstream position, where the magnetic attraction force Fr in the normal direction on the surface of the supplying roller 51 within a range between the peeling pole (second magnetic pole) S3 and the scooping pole (second magnetic pole) S2. In FIGS. 6 and 7, the low magnetic force sections NM were also shown together. By comparing FIGS. 6 and 7, the following is understood.

First, it is understood that in the case of the comparison example 2, the magnetic flux density Bθ (broken line) crosses 0 mT on a relatively upstream side of the low magnetic force section NM (i.e., that the direction of the magnetic flux density Bθ is reversed. This means that a repulsive magnetic field in which the horizontal direction of the magnetic flux density varies is liable to be formed between the peeling pole S3 and the scooping pole S2 which form the low magnetic force section NM.

On the other hand, in the case of the embodiment 1 shown in FIG. 7, the magnetic flux density Be (broken line) does not cross 0 mT until a relatively downstream side of the low magnetic force section NM (i.e., the direction of the magnetic flux density Bθ is not reversed). This means that between the peeling pole S3 and the scooping pole S2 which form the low magnetic force section NM, the horizontal direction of the magnetic flux density is not readily changed (reversed), and thus the repulsive magnetic field is not readily formed.

Further, in the most upstream position of the low magnetic force section NM, in the case of the comparison example 2 of FIG. 6, an absolute value of the magnetic flux density Bθ (broken line) in the tangential direction is lower than an absolute value of the magnetic flux density Br (solid line) in the normal direction. This means that the lines of magnetic force extend from the surface of the supplying roller 51 in a relatively vertical direction.

On the other hand, in the case of the embodiment 1 of FIG. 7, in the most upstream position of the low magnetic force section NM, an absolute value of the magnetic flux density Be (broken line) in the tangential direction is higher than an absolute value of the magnetic flux density Br (solid line) in the normal direction. This means that the lines of magnetic force extend from the surface of the supplying roller 51 while being relatively inclined.

As described above, from the above-described magnetic flux density distributions, it is understood that in the case of the embodiment 1, on the upstream side of the low magnetic force section NM between the peeling pole S3 and the scooping pole S2, the repulsive magnetic field is not readily formed and the lines of magnetic force extend while being inclined. This can be said that as shown in part (b) of FIG. 5, the state in which the lines of magnetic force extend also from the peeling pole S3 toward the regulating pole N2 existing downstream of the scooping pole S2 is capable of being illustrated, and conversely, a condition in which the lines of magnetic force extend in such a manner is expressed.

Accordingly, conditions for suppressing the developer movement with rotation of the supplying roller 51 due to a phenomenon such that the developer peeled off on the upstream side of the low magnetic force section NM flies in the direction of the surface and that the developer rebounds from the wall portion 71 as generated in the comparison example 2, by extension of the lines of magnetic force also from the peeling pole S3 toward the regulating pole N2 existing downstream of the scooping pole, S2 as described in the embodiment 1 are expressed as follows.

A first condition is that the magnetic flux density Bθ in the tangential direction does not cross 0 mT (i.e., is not reversed) until the downstream region of the low magnetic force section NM. By this, the repulsive magnetic field is not readily formed in the upstream region of the low magnetic force section NM in which the developer off from the supplying roller 51, so that the lines of magnetic force are liable to extend also from the peeling pole S3 toward the regulating pole N2 existing downstream of the scooping pole S2.

When a constitution in which the magnetic flux density Bθ in the tangential direction crosses 0 mT on a side downstream of a center position of the low magnetic force section NM is employed, the above-described suppressing effect of the developer movement with rotation of the supplying roller 51 can be obtained. That is, a constitution in which with respect to the rotational direction of the supplying roller 51, the magnetic flux density Bθ in the tangential direction of the surface of the supplying roller 51 is not reversed in a region from the most upstream position of the low magnetic force section NM to a position of ½ of the low magnetic force section NM is employed. In other words, a constitution in which a position where the direction of the magnetic flux density Bθ in the tangential direction is first reversed in the low magnetic force section NM is on a side downstream of the position of ½ of the low magnetic force section NM from the most upstream position is employed.

However, in order to obtain a sufficient suppressing effect of the developer movement with rotation of the supplying roller 51, the magnetic flux density Bθ in the tangential direction crosses 0 mT in a region preferably within ⅓, more preferably within ¼, of the low magnetic force section NM on the downstream side from the most upstream position. That is, a constitution in which with respect to the rotational direction of the supplying roller 51, the direction of the magnetic flux density Bθ in the tangential direction is not reversed in a region from the most upstream position of the low magnetic force section NM to a position (point) of ⅓ of the low magnetic force section NM on the downstream side (in other words, to a position of ⅔ (of the low magnetic force section NM) from the most upstream position) may preferably be employed. In other words, a constitution in which a position where the direction of the magnetic flux density Bθ in the tangential direction is reversed is on a side downstream of the position of ⅔ from the most upstream position may preferably be employed.

Further, a constitution in which with respect to the rotational direction of the supplying roller 51, the direction of the magnetic flux density Bθ in the tangential direction is not reversed in a region from the most upstream position of the low magnetic force section NM to a position (point) of ¼ of the low magnetic force section NM on the downstream side (in other words, to a position of ¾ (of the low magnetic force section NM) from the most upstream position) may more preferably be employed. In other words, a constitution in which a position where the direction of the magnetic flux density Bθ in the tangential direction is reversed is on a side downstream of the position of ¾ from the most upstream position may more preferably be employed. In the magnetic flux density distribution in the embodiment 1 shown in FIG. 7, the magnetic flux density Bθ (broken line) in the tangential direction crosses 0 mT in a region within ¼ on the downstream side.

A second condition is that an absolute value of the magnetic flux density BO in the tangential direction in the most upstream position of the low magnetic force section NM is higher than an absolute value of the magnetic flux density Br in the normal direction. By this, the lines of magnetic force are liable to extend from the surface of the supplying roller 51 while being inclined. As described above, when the developer is peeled off from the supplying roller 51, the developer receives a force in the normal direction to the lines of magnetic force in a position thereof. Accordingly, when the lines of magnetic force extend from the surface of the supplying roller 51 while being inclined in the most upstream position (position where the developer is peeled off) of the low magnetic force section NM, the developer further receives the force in the direction of the surface of the supplying roller 51, so that the effect of suppressing the developer movement with rotation of the supplying roller 51 can be obtained.

In the most upstream position of the low magnetic force section NM, when the absolute value of the magnetic flux density Bθ in the tangential direction on the surface of the supplying roller 51 is higher than the absolute value of the magnetic flux density Br in the normal direction on the surface of the supplying roller 51, the suppressing effect of the developer movement with rotation of the supplying roller 51 can be obtained. However, in order to sufficiently obtain the suppressing effect of the developer movement with rotation of the supplying roller 51, the absolute value of the magnetic flux density Be in the tangential direction in the most upstream position of the low magnetic force section NM may preferably be higher than 1.35 times, more preferably 1.7 times, the absolute value of the magnetic flux density Br in the normal direction in the most upstream position of the low magnetic force section MM.

That is, $B\theta/Br$ which is a ratio of the absolute value of the magnetic flux density Be in the tangential direction to the absolute value of the magnetic flux density Br in the normal direction may preferably be 1.35 times or more. Further, $B\theta/Br$ which is the ratio of the absolute value of the magnetic flux density Be in the tangential direction to the absolute value of the magnetic flux density Br in the normal direction may more preferably by 1.7 or more.

In a table 1 below, $B\theta/Br$ which is the ratio of the magnetic flux density Be in the tangential direction to the absolute value of the magnetic flux density Br in the normal direction at the most upstream position of the low magnetic force section NM in each of the comparison example 2 and the embodiment 1 was shown. Incidentally, in the table 1, $B\theta/Br$ at the most upstream position of the low magnetic force section NM in each of embodiments 2 to 4 was also shown. Further, in the table 1, an evaluation about an occurrence of the developer movement with rotation of the supplying roller 51 was also shown.

TABLE 1

| | Bθ/Br | DEVELOPER MOVEMENT*1 |
|---|---|---|
| COMP. EX. 2 | 0.78 | OCCURRED |
| EMB. 1 | 1.80 | HARDLY OCCURRED |
| EMB. 2 | 1.40 | SOMEWHAT OCCURRED |
| EMB. 3 | 2.45 | HARDLY OCCURRED |
| EMB. 4 | 1.70 | SLIGHTLY OCCURRED |

*1"DEVELOPER MOVEMENT" is the developer movement with rotation of the supplying roller 51.

From the table 1, in the embodiment 1, the absolute value of the magnetic flux density Bθ (broken line) in the tangential direction was 1.8 times the absolute value of the magnetic flux density Br (solid line) in the normal direction, and thus was higher than 1.7 times. As regards the above-described two conditions, the suppressing developer movement with rotation of the supplying roller 51 can be obtained even only by satisfying one of the two conditions, but it is preferable that the two conditions are satisfied at the same time.

[Constitution of Peeling Pole and Scooping Pole]

Next, in order to obtain a magnetic flux density distribution of the low magnetic force section NM as in the embodiment 1, how to constitute the peeling pole S3 and the scooping pole S2 which are two magnetic poles forming the low magnetic force section NM will be described.

As shown in part (b) of FIG. 5, in the developing device 4 of the embodiment 1, also from the peeling pole S3, the lines of magnetic force extend toward the regulating pole N2 downstream of the scooping pole S2. As a condition in which the lines of magnetic force extend in such a manner, the magnetic flux density Br and the half-value width are related to thereto. As described above, when values of the magnetic flux density Br and the half-value width of the peeling pole S3 and the scooping pole S2 are almost the same, the repulsive magnetic field is formed between the peeling pole S3 and the scooping pole S2 as shown in part (b) of FIG. 4.

On the other hand, when the magnetic flux density Br and the half-value width of the peeling pole S3 are sufficiently larger than those of the scooping pole S2, as shown in part (b) of FIG. 5, the lines of magnetic force extend also from the peeling pole S3 toward the regulating pole N2 downstream of the scooping pole S2. This is because the lines of magnetic force extend in a sufficient larger number from the peeling pole S3 than from the scooping pole S2. The number of the lines of magnetic force is roughly proportional to "(peak value (absolute value) of magnetic flux density Br in normal direction) [mT] x half-value width [°]" corresponding to an area of the magnetic flux density Br. For this reason, a state in which the area ("peak value (absolute value) of magnetic flux density Br in normal direction) [mT] x half-value width [°]") of the magnetic flux density Br of the peeling pole S3 is sufficiently larger than the area of the magnetic flux density Br of the scooping pole S2 becomes a condition in which the lines of magnetic force extend also from the peeling pole S3 toward the regulating pole N2 downstream of the scooping pole S2.

A table 2 below shows the magnetic flux density Br in the normal direction, the half-value width ("HW"), and the area of each of the peeling pole S3, the scooping pole S2, and the regulating pole N2 in the embodiment 1 and the embodiments 2 to 4 described later. Incidentally, as regards an area ratio of the peeling pole S3, a ratio of the area ("(peak value (absolute value) of magnetic flux density Br in normal direction) [mT]×half-value width [°]") of the peeling pole S3 to the area ("(peak value (absolute value) of magnetic flux density Br in normal direction) [mT]×half-value width [°]") of the scooping pole S2 ("(S3/S2)") is shown. Further, as regards an area ratio of the regulating pole N2, a ratio of the area ("(peak value (absolute value) of magnetic flux density Br in normal direction) [mT]×half-value width [°]") of the regulating pole N2 to the area ("(peak value (absolute value) of magnetic flux density Br in normal direction) [mT]×half-value width [°]") of the scooping pole S2 ("(N2/S2)") is shown.

TABLE 2

| | PEELING POLE S3 | | | | SCOOPING POLE S2 | | | REGULATING POLE N2 | | | |
|---|---|---|---|---|---|---|---|---|---|---|---|
| | Br[mT] | HALF-WIDTH [°] | AREA | AREA RATIO (S3/S2) | Br[mT] | HALF-WIDTH [°] | AREA | Br[mT] | HALF-WIDTH [°] | AREA | AREA RATIO (S3/S2) |
| COMP. EX. 2 | 24 | 58 | 1392 | 1.10 | 42 | 30 | 1260 | 59 | 40 | 2360 | 1.87 |
| EMB. 1 | 41 | 58 | 2378 | 1.89 | 42 | 30 | 1260 | 59 | 40 | 2360 | 1.87 |
| EMB. 2 | 33 | 58 | 1914 | 1.52 | 42 | 30 | 1260 | 59 | 40 | 2360 | 1.87 |
| EMB. 3 | 67 | 40 | 2680 | 2.12 | 42 | 30 | 1260 | 59 | 40 | 2360 | 1.87 |
| EMB. 4 | 41 | 58 | 2378 | 1.89 | 42 | 30 | 1260 | 40 | 40 | 1600 | 1.26 |

As shown in the table 2, for the supplying roller 51 in the comparison example 2, the peeling pole S3 was 24 [mT] in peak value (absolute value) of the magnetic flux density Br in the normal direction and was 58 [°] in half-value width, and the scooping pole S2 was 42 [mT] in peak value (absolute value) of the magnetic flux density Br in the normal direction and was 30 [°] in half-value width. The areas ("(peak values (absolute values) of the magnetic flux density Br in the normal direction) [mT]×half-value width

[°]") of the magnetic flux density Br of the peeling pole S3 and the scooping pole S2 were 1392 and 1260, respectively, and were roughly the same degree. Specifically, the area of the peeling pole S3 in the comparison example 2 was 1.10 times the area of the scooping pole S2 (area ratio: 1.10).

On the other hand, for the supplying roller 51 in the embodiment 1, the peeling pole S3 was 41 [mT] in peak value (absolute value) of the magnetic flux density Br in the normal direction and was 58 [°] in half-value width, and the scooping pole S2 was 42 [mT] in peak value (absolute value) of the magnetic flux density Br in the normal direction and was 30 [°] in half-value width. The areas ("(peak values (absolute values) of the magnetic flux density Br in the normal direction) [mT]×half-value width [°]") of the magnetic flux density Br of the peeling pole S3 and the scooping pole S2 were 2378 and 1260, respectively, so that the area of the peeling pole S3 in the embodiment 1 was 1.89 times larger than the area of the scooping pole S2. As a result, it would be considered that the developer movement with rotation of the supplying roller 51 was suppressed by extension of the lines of magnetic force also from the peeling pole S3 toward the regulating pole N2 downstream of the scooping pole S2.

In the following, supplying rollers 51 in the embodiments 2 to 4 prepared by remodeling the supplying roller 51 in the embodiment 1 will be described. Similarly as in the embodiment 1, peak values of the magnetic flux density Br, values of the half-value width, and the like of the supplying rollers 51 in the embodiments 2 to 4 were shown in the table 2. Further, similarly as FIG. 7 of the embodiment 1, magnetic flux density distributions and magnetic attraction forces of magnets of the supplying rollers 51 in the embodiments 2, 3 and 4 were shown in FIGS. 8, 9 and 10, respectively. Incidentally, the developing devices 4 of the embodiments 2 to 4 are the same as the developing device 4 of the embodiment 1 except for the magnets of the supplying rollers 51 thereof, and therefore, description other than differences from the embodiment 1 will be omitted.

Embodiment 2

As shown in the table 2, the supplying roller 51 in the embodiment 2 is lower in peak value of the magnetic flux density Br in the normal direction of the peeling pole S3 than the supplying roller 51 in the embodiment 1 but is higher than the supplying roller 51 in the comparison example 2, and the area ratio in the embodiment 2 is 1.52 times the area ratio in the comparison example 1. When the developer movement with rotation of the supplying roller 51 in the embodiment 2 was checked, the suppressing effect of the developer movement with rotation of the supplying roller 51 was obtained, but resulted in that the suppressing effect was somewhat inferior to the suppressing effect in the embodiment 1. That is, in the embodiment 1, the developer movement with rotation of the supplying roller 51 hardly occurred, but in the embodiment 2, the developer movement with rotation of the supplying roller 51 somewhat occurred (table 1) although a degree thereof is not the degree thereof in the comparison example 2 and there was substantially no influence on an output image.

When the results of the embodiment 1 and the embodiment 2 are considered in combination, it can be said that the suppressing effect of the developer movement with rotation of the supplying roller 51 can be obtained when the ratio of the area ("(peak value (absolute value) of magnetic flux density Br in normal direction) [mT]×half-value width [°]" of the peeling pole S3 to the area of the scooping pole S2 is 1.5 or more, i.e., when the area of the peeling pole S3 is 1.5 times or more larger than the area of the scooping pole S2, the suppressing effect of the developer movement with rotation of the supplying roller 51 can be obtained, and that it is preferable that the area of the peeling pole S3 is 1.8 times or more larger than the area of the scooping pole S2. That is, the product of the absolute value of the peak value and the half-value width of the magnetic flux density Br in the normal direction of the peeling pole (second magnetic pole) S3 at the surface of the supplying roller 51 is made 1.5 times or more the product of the absolute value of the peak value and the half-value width of the magnetic flux density Br in the normal direction of the scooping pole (third magnetic pole) S2 at the surface of the supplying roller 51, so that the suppressing effect of the developer movement with rotation of the supplying roller 51 can be obtained. Further, the product of the absolute value of the peak value and the half-value width of the magnetic flux density Br in the normal direction of the peeling pole S3 may preferably be made 1.8 times or more the product of the absolute value of the peak value and the half-value width of the magnetic flux density Br in the normal direction of the magnetic pole of the scooping pole S2.

Next, when the magnetic flux density distribution in the embodiment 2 shown in FIG. 8 is viewed, also in the embodiment 2, the magnetic flux density Bθ in the tangential direction crosses 0 mT in a region within ¼ of the low magnetic force section NM on the downstream side, so that also from this point, in the embodiment 2, suppression of the developer movement with rotation of the supplying roller 51 is capable of being explained. On the other hand, as shown in also the table 1, at the most upstream position of the low magnetic force section NM, the absolute value of the magnetic flux density Bθ in the tangential direction was 1.4 times the absolute value of the magnetic flux density Br in the normal direction. As described above, the magnetic flux density Bθ may preferably be 1.35 times, more preferable be 1.7 times, larger than the magnetic flux density Br. On the other hand, in the embodiment 2, the magnetic flux density Bθ is 1.4 times the magnetic flux density Br, and thus is 1.35 time or more but is 1.7 times or less. When a point that in the embodiment 1, the magnetic flux density Bθ is 1.8 times the magnetic flux density Br and thus is 1.7 times or more is taken into consideration, in the embodiment 2, it can be explained that the suppressing effect of the developer movement with rotation of the supplying roller 51 can be obtained but was somewhat inferior to that in the embodiment 1.

Embodiment 3

Next, the embodiment 3 will be described. The In the supplying roller 51 in the embodiment 3 is, as shown in the table 2, the half-value width of the peeling pole S3 is small compared with those in the comparison example 2 and the embodiment 1, but the magnetic flux density Br in the normal direction is larger than those in the comparison example 2 and the embodiment 1, and the area ratio is 2.12 (times). When the developer movement with rotation of the supplying roller 51 was checked, a result that the developer movement can be suppressed to almost the same degree as that in the embodiment (table 1). Accordingly, even when the half-value width is narrow as in the embodiment 3, by increasing the magnetic flux density Br in the normal direction, it is understood that the developer movement with rotation of the supplying roller 51 can be suppressed. This represents that the area ("peak value (absolute value) of magnetic flux density Br in normal direction) [mT]×half-value width [°]") obtained by multiplying both the magnetic flux density Br in the normal direction and the half-value width, not from either one of the magnetic flux density Br in the normal direction and the half-value width has the influence on the suppression of the developer movement with rotation of the supplying roller 51.

When the magnetic flux density distribution in the embodiment 3 shown in FIG. 9 is viewed, also in the embodiment 2, the magnetic flux density BO in the tangential direction crosses OmT in a region within ¼ of the low magnetic force section NM on the downstream side. Further, as also shown in table 1, at the most upstream position of the low magnetic force section NM, the absolute value of the magnetic flux density BO in the tangential direction was 2.45 times the absolute value of the magnetic flux density Br in the normal direction, and thus is 1.7 times or more which is a preferable value. Also, from this point, it is possible to explain in the embodiment 3 that the suppressing effect of the developer movement with rotation of the supplying roller 51 is high.

Embodiment 4

Next, the embodiment 3 will be described. As shown in the table 2, the supplying roller 51 in the embodiment 4 is the same in values of the magnetic flux density Br and half-value widths of the peeling pole S3 and the scooping pole S2 when compared with those in the embodiment 1. However, when the developer movement with rotation of the supplying roller 51 in the embodiment 4 was checked, the suppressing effect of the developer movement with rotation of the supplying roller 51 was obtained, but resulted in that the suppressing effect was slightly inferior to the suppressing effect in the embodiment 1. That is, in the embodiment 1, the developer movement with rotation of the supplying roller 51 hardly occurred, but in the embodiment 4, the developer movement with rotation of the supplying roller 51 slightly occurred (table 1) although a degree thereof is not the degree thereof in the embodiment 2 and there was substantially no influence on an output image. This would be considered for the following reason.

As shown in the table 2, for the supplying roller 51 in the embodiment 4, compared with the embodiment 1, the magnetic flux density Br of the regulating pole N2 existing downstream of the scooping pole S2 and different in polarity from the scooping pole S2 is small. As a result, the area ("peak value (absolute value) of magnetic flux density in normal direction) [mT]×half-value width [°]") obtained by multiplying the magnetic flux density Br of the regulating pole N2 and the half-value width becomes smaller than the area in the case of the embodiment 1. From this, in the embodiment 4, the area of the magnetic flux density of the peeling pole S3 is sufficiently larger than the area of the magnetic flux density of the scooping pole S2 and the lines of magnetic force extend from the peeling pole S3 in sufficiently larger number, but the area of the magnetic flux density of the regulating pole N2 is small, and therefore, it would be considered that the lines of magnetic force cannot readily extend in the direction of the regulating pole N2, and thus the suppressing effect of the developer movement with rotation of the supplying roller 51 is decreased.

A manner of extension of the lines of magnetic force in the low magnetic force section NM largely depends on the two poles (the peeling pole S3 and the scooping pole S2) forming the low magnetic force section NM. However, when the area of the magnetic pole (the regulating pole N2 in this embodiment) which is positioned downstream of the magnetic pole (the scooping pole S2 in this embodiment) on the side downstream of the low magnetic force section NM and which is different in polarity becomes small, the decreased area has the influence on the suppressing effect of the developer movement with rotation of the supplying roller 51. The regulating pole (fourth magnetic pole) N2 is disposed upstream of the main pole (first magnetic pole) N1 and downstream of and adjacent to the scooping pole (third magnetic pole) S2 with respect to the rotational direction of the supplying roller 51, and is different in polarity from the scooping pole S2, so that the area of this regulating pole N2 has the influence on the developer movement with rotation of the supplying roller 51.

When the magnetic poles in this embodiment are described an example, it is important that the area of the regulating pole N2 is at least larger than the area of the scooping pole S2. Further, as in the embodiment 4 (this embodiment), the area of the regulating pole N2 may preferably be 1.25 times or more the area of the scooping pole S2 and may more preferably be 1.5 times or more the area of the scooping pole S2 as in the embodiment 1. That is, the product of the absolute value of the peak value and the half-value width of the magnetic flux density Br in the normal direction of the regulating pole N2 may preferably be 1.25 times or more the product of the absolute value of the peak value and the half-value width of the magnetic flux density Br in the normal direction of the scooping pole S2 at the surface of the supplying roller 51. Further, the product of the absolute value of the peak value and the half-value width of the magnetic flux density Br in the normal direction of the regulating pole N2 may more preferably be made 1.5 times or more the product of the absolute value of the peak value and the half-value width of the magnetic flux density Br in the normal direction of the scooping pole S2.

Next, when the magnetic flux density distribution in the embodiment 4 shown in FIG. 10 is viewed, in the embodiment 4, the magnetic flux density Bθ in the tangential direction crosses 0 mT in a region from ⅓ to ¼ of the low magnetic force section NM on the downstream side. In the embodiment 1, the magnetic flux density Bθ in the tangential direction crosses 0 mT in the region within ¼ of the low magnetic force section NM, and in the embodiment 4, the magnetic flux density Bθ in the tangential direction crosses 0 mT in a region on a side upstream of the region in the embodiment 1. This would be considered because the area of the regulating pole N2 in the embodiment 4 is small, and therefore, a state in which the lines of magnetic force from the peeling pole S3 do not readily extend in the direction of the regulating pole N2 is reflected.

From the above, as described above, when a constitution in which the magnetic flux density Bθ in the tangential direction crosses 0 mT at a position on a side downstream of the center position of the low magnetic force section NM is employed, the suppressing effect of the developer movement with rotation of the supplying roller 51 can be obtained. However, in order to sufficiently obtain the developer movement suppressing effect, the magnetic flux density Bθ may preferably cross 0 mT in a region within ⅓, more preferably with ¼, on the downstream side of the low magnetic force section NM. On the other hand, in the embodiment 4, as shown in also the table 1, at the most upstream position of the low magnetic force section NM, the absolute value of the magnetic flux density Bθ in the tangential direction was 1.7 times the absolute value of the magnetic flux density Br in the normal direction.

In the embodiment 1, Bθ/Br was 1.8 (times), and therefore, in the embodiment 4 Bθ/Br is not largely changed from Bθ/Br in the embodiment 1. From the above, although the developer movement suppressing effect lowers compared with the embodiment 1, the reason why a degree of the lowering is slight is capable of being explained.

The embodiments 1 to 4 satisfying a requirement of this embodiment includes the main pole N1 upstream of and different in polarity from the peeling pole S3 of the supplying roller 51. The main pole N1 substantially opposes the developing roller 50, and the developing roller 50 includes the magnet roller 50*a* provided with a sing pole which is a receiving pole S4 different in polarity from the main pole N1. The magnet roller 50*a* (receiving pole S4) of the developing roller 50 is not necessarily needed, but as in this embodiment, when the magnet roller 50*a* (receiving pole S4) is provided, there is a tendency that the developer movement suppressing effect is somewhat enhanced. This would be considered for the following reason.

A manner of extension of the lines of magnetic force of the low magnetic force section NM largely depends on the two poles (the peeling pole S3 and the scooping pole S2 in the case of this embodiment) forming the low magnetic force section NM. However, as described in explanation of the embodiment 4, also the magnetic pole (regulating pole L2) downstream of and different in polarity from the magnetic poles S3 and S2 somewhat has the influence on the developer movement suppressing effect. According to study of the present inventor, similarly, also the magnetic pole (main pole N1) upstream of and different in polarity from the magnetic poles S3 and S2 somewhat has the influence on the developer movement suppressing effect.

In order to obtain the developer movement suppressing effect, as shown in FIG. 5, it was important that from the upstream magnetic pole (peeling pole S3) forming the low magnetic force section NM, the lines of magnetic force extend toward the magnetic pole (regulating pole N2) further downstream of and different in polarity from the downstream magnetic pole (scooping pole S2). If the lines of magnetic force are liable to extending from the peeling pole S3 toward the magnetic pole (main pole N1) upstream of and different in polarity from the peeling pole S3, it would be considered that the lines of magnetic force become hard to extend from the peeling pole S3 toward the regulating pole N2. At this time, as in this embodiment, when the magnetic pole (receiving pole S3) different in polarity from the main pole N1 exists inside the developing roller 50 so as to substantially oppose the main pole N1, the lines of magnetic force extend toward the receiving pole S4 of the developing roller 50 close in distance from the main pole N1. For this reason, the lines of magnetic force become hard to extend between the peeling pole S3 and the main pole N1. Then, from the peeling pole S3, the lines of magnetic force are liable to extend toward the regulating pole N2, and thus it would be considered that the suppressing effect of the developer movement with rotation of the supplying roller 51 becomes easy to be obtained.

As described above, the developer movement suppressing effect can be further obtained by disposing the magnetic pole (receiving magnetic pole S4), different in polarity from the magnetic pole (main pole N1), inside the developing roller 50 substantially opposing the magnetic pole (main pole N1) upstream of and different in polarity from the two poles forming the low magnetic force section NM of the supplying roller 51.

As described above, by employing the constitution of this embodiment, it is possible to suppress that the toner on the supplying roller 51 is moved to and consumed on the developing roller 50 and then causes the occurrence of the developer movement with rotation of the supplying roller 51. As a result of this, it is possible to prevent an inconvenience such that the image density lower with advance of the image formation as in the comparison examples.

Other Embodiments

In the above-described embodiments, the case where the present invention is applied to the developing device for use in the image forming apparatus of the tandem type was described. However, the present invention is also applicable to the developing device for use in the image forming apparatus of another type. Further, the image forming apparatus is not limited to the image forming apparatus for a full-color image, but may also be an image forming apparatus for a monochromatic image or an image forming apparatus for a mono-color (single color) image. Or, the image forming apparatus can be carried out in various uses, such as printers, various printing machines, copying machines, facsimile machines and multi-function machines by adding necessary devices, equipment and casing structures or the like.

Further, also as regards the structure of the developing device, as described above, the structure is not limited to a structure in which the developing chamber and the stirring chamber are disposed in the horizontal direction, but may also be a structure in which the developing chamber and the stirring chamber are disposed in a direction inclined with respect to the horizontal direction. In summary, a constitution in which the developing chamber as the first chamber and the stirring chamber as the second chamber are disposed adjacent to each other so as to partially overlap with each other as viewed in the horizontal direction may only be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066247 filed on Apr. 14, 2023, which is hereby incorporated by reference herein in its entirety.

What is claimed is:

1. A developing device comprising:

a developing container configured to accommodate a developer containing toner and a carrier;

a developing roller configured to carry and convey the toner to a developing position where an electrostatic latent image formed on an image bearing member is developed with the toner;

a supplying roller provided opposed to the developing roller and configured to supply only the toner to the developing roller while carrying and conveying the developer supplied from the developing container;

a regulating member provided opposed to the supplying roller and configured to regulate an amount of the developer carried by the supplying roller;

a first magnet provided non rotationally and fixedly inside the developing roller and including a first magnetic pole; and a second magnet provided non rotationally and fixedly inside the supplying roller and including a second magnetic pole which is provided opposed to the first magnetic pole and which is different in polarity from the first magnetic pole, a third magnetic pole provided downstream of the second magnetic pole with respect to a rotational direction of the supplying roller, and a fourth magnetic pole which is provided downstream of and adjacent to the third magnetic pole with respect to the rotational direction of the supplying roller and which is the same in polarity as the third magnetic pole, wherein with respect to the rotational direction of the supplying roller, a position where a magnetic flux density of the third magnetic pole in a normal direction of the supplying roller is maximum is downstream of a position on the supplying roller where the supplying roller is closest to the developing roller, and is upstream of a position on the supplying roller where the regulating member is closest to the supplying roller, wherein with respect to the rotational direction of the supplying roller, a region where an absolute value of a magnetic flux density in the normal direction of the supplying roller is 5 [mT] or less exists downstream of the position where the magnetic flux density of the third magnetic pole in the normal direction of the supplying roller is maximum, and exists upstream of a position where a magnetic flux density of the fourth magnetic pole in the normal direction of the supplying roller is maximum, wherein a most upstream position of the region with respect to the rotational direction of the supplying roller exists above a rotation center of the supplying roller in a vertical direction, and wherein an absolute value of a magnetic flux density in a tangential direction of the supplying roller in the most upstream position of the region is larger than an absolute value of a magnetic flux density in the normal direction of the supplying roller in the most upstream position of the region.

2. A developing device according to claim 1, wherein, a ratio of the absolute value of the magnetic flux density in the tangential direction of the supplying roller in the most upstream position of the region to the absolute value of the magnetic flux density in the normal direction of the supplying roller in the most upstream position of the region is 1.35 or more.

3. A developing device according to claim 1, wherein a ratio of the absolute value of the magnetic flux density in the tangential direction of the supplying roller in the most upstream position of the region to the absolute value of the magnetic flux density in the normal direction of the supplying roller in the most upstream position of the region is 1.7 or more.

4. A developing device according to claim 1, wherein a direction of the magnetic flux density in the tangential direction of the supplying roller is not reversed in a section from the most upstream position of the region to a position that is downstream therefrom by one-half of the length of the region in the rotational direction of the supplying roller.

5. A developing device according to claim 1, wherein a direction of the magnetic flux density in the tangential direction of the supplying roller is not reversed in a section from the most upstream position of the region to a position that is downstream therefrom by two-thirds of the length of the region in the rotational direction of the supplying roller.

6. A developing device according to claim 1, wherein a direction of the magnetic flux density in the tangential direction of the supplying roller is not reversed in a section from the most upstream position of the region to a position that is downstream therefrom by three-fourths of the length of the region in the rotational direction of the supplying roller.

7. A developing device according to claim 1, wherein a product between an absolute value of a maximum value of the magnetic flux density of the third magnetic pole in the normal direction of the supplying roller and a half value width of the magnetic flux density of the third magnetic pole in the normal direction of the supplying roller is 1.5 times or more than a product between an absolute value of a maximum value of the magnetic flux density of the fourth magnetic pole in the normal direction of the supplying roller and a half value width of the magnetic flux density of the fourth magnetic pole in the normal direction of the supplying roller.

8. A developing device according to claim 1, wherein a product between an absolute value of a maximum value of the magnetic flux density of the third magnetic pole in the normal direction of the supplying roller and a half value width of the magnetic flux density of the third magnetic pole in the normal direction of the supplying roller is 1.8 times or more than a product between an absolute value of a maximum value of the magnetic flux density of the fourth magnetic pole in the normal direction of the supplying roller and a half value width of the magnetic flux density of the fourth magnetic pole in the normal direction of the supplying roller.

9. A developing device according to claim 1, wherein the second magnet further includes a fifth magnetic pole which is provided upstream of the second magnetic pole and downstream of and adjacent to the fourth magnetic pole with respect to the rotational direction of the supplying roller and which is different in polarity from the fourth magnetic pole, and wherein a product between an absolute value of a maximum value of the magnetic flux density of the fifth magnetic pole in the normal direction of the supplying roller and a half value width of the magnetic flux density of the fifth magnetic pole in the normal direction of the supplying roller is 1.25 times or more than a product between an absolute value of a maximum value of the magnetic flux density of the fourth magnetic pole in the normal direction of the supplying roller and a half value width of the magnetic flux density of the fourth magnetic pole in the normal direction of the supplying roller.

10. A developing device according to claim 9, wherein the fifth magnetic pole is provided opposed to the regulating member.

11. A developing device according to claim 1, wherein the second magnet further includes a fifth magnetic pole which is provided upstream of the second magnetic pole and downstream of and adjacent to the fourth magnetic pole with respect to the rotational direction of the supplying roller and which is different in polarity from the fourth magnetic pole, and wherein a product between an absolute value of a maximum value of the magnetic flux density of the fifth magnetic pole in the normal direction of the supplying roller and a half value width of the magnetic flux density of the fifth magnetic pole in the normal direction of the supplying roller is 1.5 times or more than a product between an absolute value of a maximum value of the magnetic flux density of the fourth magnetic pole in the normal direction of the supplying roller and a half value width of the magnetic flux density of the fourth magnetic pole in the normal direction of the supplying roller.

12. A developing device according to claim 11, wherein the fifth magnetic pole is provided opposed to the regulating member.

13. A developing device according to claim 1, wherein with respect to the rotational direction of the supplying roller, the most upstream position of the region is located 3° or more upstream of an intersecting point at which a horizontal line passing through the rotation center of the supplying roller intersects an outer peripheral surface of the supplying roller, the intersect point being downstream of the position where the magnetic flux density of the third magnetic pole in the normal direction of the supplying roller is maximum and upstream of the position where the magnetic flux density of the fourth magnetic pole in the normal direction of the supplying roller is maximum.

14. A developing device according to claim 1, wherein with respect to the rotational direction of the supplying roller, the most upstream position of the region is located 6° or more upstream of an intersect point at which a horizontal line passing through the rotation center of the supplying roller intersects an outer peripheral surface of the supplying roller, the intersect point being downstream of the position where the magnetic flux density of the third magnetic pole in the normal direction of the supplying roller is maximum and upstream of the position where the magnetic flux density of the fourth magnetic pole in the normal direction of the supplying roller is maximum.

* * * * *